(12) United States Patent
Zeng et al.

(10) Patent No.: US 10,924,648 B2
(45) Date of Patent: Feb. 16, 2021

(54) ELECTRONIC ASSEMBLY AND ELECTRONIC DEVICE

(71) Applicant: GUANGDONG OPPO MOBILE TELECOMMUNICATIONS CORP., LTD., Guangdong (CN)

(72) Inventors: Zanjian Zeng, Guangdong (CN); Feng Xiong, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 6 days.

(21) Appl. No.: 16/428,684

(22) Filed: May 31, 2019

(65) Prior Publication Data
US 2019/0373153 A1    Dec. 5, 2019

(30) Foreign Application Priority Data

Jun. 2, 2018  (CN) .......................... 2018 1 0560028
Jun. 2, 2018  (CN) ..................... 2018 2 0849423 U

(51) Int. Cl.
*H04N 5/225* (2006.01)
*H04M 1/02* (2006.01)

(52) U.S. Cl.
CPC ........ *H04N 5/2257* (2013.01); *H04M 1/0264* (2013.01); *H04M 1/0272* (2013.01); *H04N 5/2254* (2013.01); *H04N 5/2256* (2013.01)

(58) Field of Classification Search
CPC .. H04N 5/2257; H04N 5/2254; H04N 5/2256; H04M 1/0264; H04M 1/0272;
(Continued)

(56) References Cited

U.S. PATENT DOCUMENTS 9,313,393 B2    4/2016  Olsen et al.
2004/0021792 A1*  2/2004  Yasui ..................... H04N 7/142
                                                    348/373
(Continued)

FOREIGN PATENT DOCUMENTS

CN          102494609        6/2012
CN          105319724        2/2016
(Continued)

OTHER PUBLICATIONS

EPO, Office Action for EP Application No. 19177615.2, dated Nov. 6, 2019.
(Continued)

*Primary Examiner* — Abdelaaziz Tissire
(74) *Attorney, Agent, or Firm* — Hodgson Russ LLP

(57) ABSTRACT

An electronic assembly and an electronic device are provided. The electronic assembly includes a bracket, a depth element configured to acquire depth image information, a first camera configured to acquire first hue image information, a projector and a second camera configured to acquire second hue image information. The depth element, the first camera, the projector and the second camera are arranged on the bracket together, and the second camera is arranged between the depth element and the first camera, and an image acquisition direction of the second camera is opposite to an image acquisition direction of the first camera.

19 Claims, 12 Drawing Sheets

(58) Field of Classification Search
CPC .. G03B 2217/002; G03B 17/56; G03B 35/00; G03B 17/02
See application file for complete search history.

(56) References Cited

U.S. PATENT DOCUMENTS

| | | | |
|---|---|---|---|
| 2009/0017867 A1 | 1/2009 | Koh | |
| 2010/0134598 A1* | 6/2010 | St-Pierre | G01B 11/2513 348/47 |
| 2012/0081550 A1* | 4/2012 | Sewell | H04N 5/2251 348/148 |
| 2012/0086784 A1* | 4/2012 | Oh | H04N 13/239 348/47 |
| 2012/0176760 A1* | 7/2012 | Cohen | H04M 1/026 361/807 |
| 2012/0229700 A1* | 9/2012 | Hsiung | G03B 11/043 348/371 |
| 2014/0240464 A1* | 8/2014 | Lee | G01B 11/2545 348/47 |
| 2015/0381860 A1* | 12/2015 | De Nardi | H04N 5/2251 348/376 |
| 2016/0069670 A1* | 3/2016 | Ruhland | G01B 11/002 356/610 |
| 2016/0191760 A1* | 6/2016 | Wu | H04N 5/2257 348/262 |
| 2016/0191769 A1* | 6/2016 | Yeh | H04N 5/2251 348/47 |
| 2017/0026585 A1* | 1/2017 | Shaw | H04N 5/2252 |
| 2017/0054965 A1* | 2/2017 | Raab | H04N 13/239 |
| 2017/0085764 A1* | 3/2017 | Kim | H04N 5/23296 |
| 2017/0124392 A1* | 5/2017 | Gu | H04N 5/2257 |
| 2017/0195654 A1* | 7/2017 | Powers | H04N 5/23241 |
| 2017/0244903 A1* | 8/2017 | Yang | H04N 5/23216 |
| 2017/0295642 A1 | 10/2017 | Codd et al. | |
| 2018/0091712 A1* | 3/2018 | Lee | G01J 3/513 |
| 2018/0098050 A1 | 4/2018 | Oshrat et al. | |
| 2018/0241861 A1* | 8/2018 | Kim | H04M 1/026 |
| 2018/0321383 A1* | 11/2018 | Heidemann | G01B 11/2545 |
| 2019/0012544 A1* | 1/2019 | Park | H04N 5/2257 |
| 2019/0041904 A1* | 2/2019 | Fletcher | G06F 3/012 |
| 2019/0041909 A1* | 2/2019 | Pakula | G06F 1/26 |
| 2019/0082083 A1* | 3/2019 | Jarvis | H04N 5/2251 |
| 2019/0311180 A1* | 10/2019 | Tang | H04N 5/2253 |

FOREIGN PATENT DOCUMENTS

| | | | |
|---|---|---|---|
| CN | 106657456 | 5/2017 | |
| CN | 206698329 U | * 12/2017 | .......... H04N 5/2256 |
| CN | 206865558 | 1/2018 | |
| CN | 107918459 | 4/2018 | |
| CN | 207218938 | 4/2018 | |
| CN | 108513055 | 9/2018 | |
| CN | 208489914 | 2/2019 | |
| TW | M545271 | 7/2017 | |

OTHER PUBLICATIONS

TIPO, Office Action for TW Application No. 108113774, dated Jan. 9, 2020.
WIPO, English translation of the ISR and WO for PCT/CN2019/075358, Apr. 29, 2019.

* cited by examiner

ELECTRONIC ASSEMBLY AND ELECTRONIC DEVICE

CROSS-REFERENCE TO RELATED APPLICATIONS

This application claims priority to Chinese Patent Application No. 201820849423.4 and Chinese Patent Application No. 201810560028.9, each filed Jun. 2, 2018. The entire disclosures of the aforementioned patent applications are incorporated herein by reference.

FIELD

The present application relates to a field of electronic devices, and more particularly to an electronic assembly and an electronic device.

BACKGROUND

With the development of science and technology and due to the market demand, the demand for shooting of a mobile phone become higher and higher. In the related art, one flash lamp and two cameras are integrated in the mobile phone for shooting at the meantime, so as to achieve images of better visual effects.

SUMMARY

The present application provides an electronic assembly and an electronic device, which can improve the mounting efficiency.

According to a first aspect of embodiments of the present application, an electronic assembly is provided. The electronic assembly includes a bracket, a depth element configured to acquire depth image information, a first camera configured to acquire first hue image information, a projector and a second camera configured to acquire second hue image information. The depth element, the first camera, the projector and the second camera are arranged on the bracket together, and the second camera is arranged between the depth element and the first camera, and an image acquisition direction of the second camera is opposite to an image acquisition direction of the first camera.

According to a second aspect of embodiments of the present application, an electronic device is provided. The electronic device includes a housing, a display module and an electronic assembly. The display module covers the housing, and the electronic assembly is arranged in the housing. The electronic assembly includes a bracket as well as a depth element, a first camera, a projector and a second camera arranged on the bracket. The second camera is arranged between the depth element and the first camera. The depth element is configured to acquire depth image information. The first camera is configured to acquire first hue image information in a direction towards the display module, and the second camera is configured to acquire second hue image information in a direction facing away from the display module.

According to a third aspect of embodiments of the present application, another electronic device is provided. The electronic device includes a middle frame, a sliding base, a guide mechanism, a drive mechanism and an electronic assembly received in the sliding base. The middle frame includes a pair of opposite side end faces and a top end face connected between the pair of side end faces, the top end face defining a receiving groove, and the receiving groove passes through the pair of side end faces. The sliding base is received in the receiving groove and slidably connected to the middle frame via the drive mechanism. The guide mechanism is arranged between the sliding base and the middle frame, such that the sliding base is configured to be driven by the drive mechanism to extend out of or be received in the receiving groove along a guide direction of the guide mechanism. The electronic assembly includes a bracket as well as a depth element, a first camera, a projector and a second camera arranged on the bracket. The second camera is arranged between the depth element and the first camera. The depth element is configured to acquire depth image information. The first camera is configured to acquire first hue image information in a first direction, and the second camera is configured to acquire second hue image information in a second direction. The first direction is opposite to the second direction. The sliding base is provided with a first function portion, a second function portion and a third function portion in the same face, and a fourth function portion facing away from the first function portion. The depth element is configured to capture the depth image information through the first function portion. The first camera is configured to capture the first hue image information through the second function portion. The projector is configured to conduct projection through the third function portion. The second camera is configured to capture the second hue image information through the fourth function portion.

BRIEF DESCRIPTION OF THE DRAWINGS

In order to illustrate the technical solution of embodiments of the present application more clearly, the drawings used in the embodiments will be introduced briefly. Obviously, the following drawings to be described are some embodiments of the present application, and those ordinary skilled in the art can obtain other drawings according to these drawings without creative efforts.

DETAILED DESCRIPTION

Figure 1:
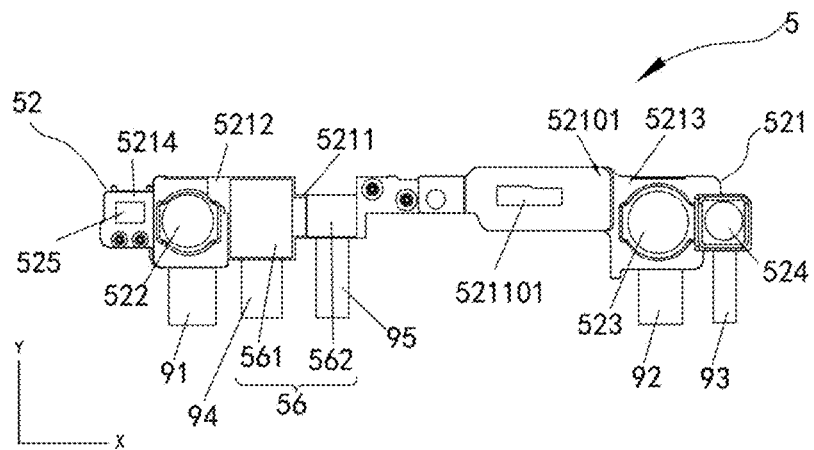
FIG. 1 is a schematic view of an electronic assembly according to an embodiment of the present application.

Technical solutions in embodiments of the present application will be clearly and completely described with reference to drawings in the embodiments of the present application. Obviously, the embodiments to be described are merely parts of the embodiments of the present application, but not all of the embodiments. All other embodiments obtained by persons of ordinary skill in the art based on the embodiments of the present application without creative efforts shall fall within the protection scope of the present application.

In the description of the embodiments of the present application, it should be understood that, orientations or locations indicated by terms such as "length", "width", "thickness", "X direction", "Y direction", "Z direction" should be construed to refer to orientations or locations shown in the drawings, which merely intends to facilitate and simplify the description of the present application, but does not imply or indicate that the device or the element referred to must have a particular orientation or be constructed or operated in a particular orientation. Thus, these terms should not be construed to limit the present application.

Embodiments of the present application provide an electronic assembly, the electronic assembly includes a bracket, a depth element configured to acquire depth image information, a first camera configured to acquire first hue image information, a projector and a second camera configured to acquire second hue image information. The depth element, the first camera, the projector and the second camera are arranged on the bracket together, and the second camera is arranged between the depth element and the first camera, and an image acquisition direction of the second camera is opposite to an image acquisition direction of the first camera.

Embodiments of the present application provide an electronic device, and the electronic device includes: a housing; a display module covered on the housing; and an electronic assembly arranged in the housing, the electronic assembly including a bracket as well as a depth element, a first camera, a projector and a second camera arranged on the bracket, the second camera being arranged between the depth element and the first camera, the depth element being configured to acquire depth image information, the first camera being configured to acquire first hue image information in a direction towards the display module, and the second camera being configured to acquire second hue image information in a direction facing away from the display module.

Embodiments of the present application provide another electronic device, and the electronic device includes: a middle frame including a pair of opposite side end faces and a top end face connected between the pair of side end faces, the top end face defining a receiving groove, the receiving groove passing through the pair of side end faces; a sliding base received in the receiving groove; a guide mechanism arranged between the sliding base and the middle frame; a drive mechanism, the sliding base being slidably connected to the middle frame through the drive mechanism, such that the sliding base is configured to extend out of or be received in the receiving groove along a guide direction of the guide mechanism, under the drive of the drive mechanism; and an electronic assembly received in the sliding base, the electronic assembly including a bracket as well as a depth element, a first camera, a projector and a second camera arranged on the bracket, the second camera being arranged between the depth element and the first camera, the depth element being configured to acquire depth image information, the first camera being configured to acquire first hue image information in a first direction, the second camera being configured to acquire second hue image information in a second direction, and the first direction being opposite to the second direction. The sliding base includes a first function portion, a second function portion, a third function portion in a same face thereof, and a fourth function portion facing away from the first function portion, the depth element is configured to capture the depth image information through the first function portion, the first camera is configured to capture the first hue image information through the second function portion, the projector is configured to conduct projection through the third function portion, and the second camera is configured to capture the second hue image information through the fourth function portion.

As illustrated in FIG. 1, three directions (i.e. X direction, Y direction and Z direction) are defined when a bracket 521 is illustrated at a first perspective, and any two of the three directions are perpendicular to each other.

As illustrated in FIG. 1, embodiments of the present application provide an electronic assembly 5. The electronic assembly 5 includes a bracket 521, a depth element 522 configured to acquire depth image information, a first camera 523 configured to acquire first hue image information, a projector 524 and a second camera 561 configured to acquire second hue image information. The depth element 522, the first camera 523, the projector 524 and the second camera 561 are arranged on the bracket 521 together, and the second camera 561 is located between the depth element 522 and the first camera 523. An image acquisition direction of the second camera 561 is opposite to an image acquisition direction of the first camera 523.

It should be understood that, as illustrated in FIG. 1, the electronic assembly 5 further includes a third camera 562, and the third camera 562 is arranged adjacent to the second camera 561. An image acquisition direction of the third camera 562 is same with the image acquisition direction of the second camera 561.

It should be understood that, as illustrated in FIG. 1, the depth element 522, the first camera 523 and the projector 524 are used for 3D recognition. For convenience of description, a combination of the above elements is called as an imaging assembly 52. The second camera 561 and the third camera 562 are essentially used for rear shooting, and therefore, a combination of the second camera 561 and the third camera 562 is called as a shooting assembly 56.

In other words, in the present application, the imaging assembly 52 and the shooting assembly 56 are arranged on the same bracket 521 together, that is, a plurality of elements are mounted on the bracket 521 together, such that the mounting of the plurality of elements can be completed by mounting the bracket 521 on a device where the plurality of elements are to be mounted during the mounting of the plurality of elements, which improves the mounting efficiency.

The arrangement of the imaging assembly 52 on the bracket 521 will be described in the following.

In an embodiment, as illustrated in FIG. 1, the depth element 522 is an infrared camera, and the projector 524 is an infrared laser projector 524. The projector 524 projects an infrared light according to a subject to be shot. The depth element 522 receives the infrared light reflected back by the subject to be shot, and acquires spatial information, i.e. depth image information, of the subject to be shot by calculation. Of course, in other embodiments, the depth element 522 may be other elements configured to capture the depth image information, such as an ultraviolet camera, an optical field camera, a rangefinder camera or the like. Accordingly, since the depth element 522 receives the depth image information reflected back by the subject to be shot, the projector 524 corresponds to the depth element 522. For example, the depth element 522 is the ultraviolet camera, while the projector 524 is an ultraviolet laser projector.

Figure 15:
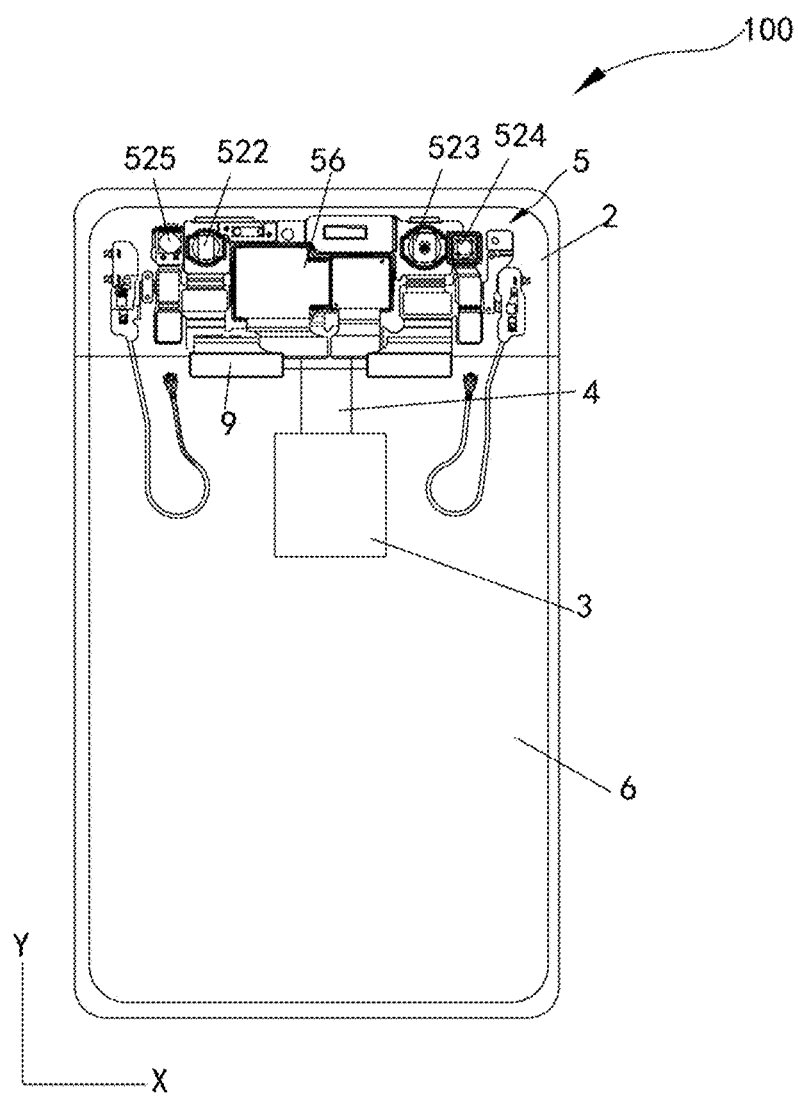
FIG. 15 is a schematic view of the electronic device in FIG. 13 from still another angle.

It should be understood that, as illustrated in FIG. 1, the depth element 522, the first camera 523 and the projector 524 are all electrically coupled to a main board 6 (as illustrated in FIG. 15), such that an image processing chip on the main board 6 can process the image information captured by the depth element 522 and the first camera 523 to generate a target image.

It should be understood that, the imaging assembly 52 of the present application may be applied to application scenarios such as face recognition. In other words, the subject to be shot is a human face. The imaging assembly 52 has following specific operations. The projector 524 is configured to emit a specially modulated infrared light to the subject to be shot, the depth element 522 receives the infrared light reflected back by the subject to be shot and acquires the spatial information of the subject to be shot by calculation. The first camera 523 is configured to shoot a color image of the subject to be shot. The image information captured by the depth element 522 and the first camera 523 is sent to the image processing chip, and the image processing chip can combine the depth image information with the first hue image information, and obtain the target image after processing by algorithm. The target image may be a color image with depth information.

When the depth element 522 and the first camera 523 capture the image information of the subject to be shot, the image information of the above two overlaps, which is defined as image overlapping area information herein. The image processing chip just processes the image overlapping area information to generate the color image with depth information. Therefore, a distance among the depth element 522, the first camera 523 and the projector 524 will affect a shooting performance of the imaging assembly 52.

In the related art, the depth element 522, the first camera 523 and the projector 524 are scattered at edges and corners of an electronic device 100. During assembling, an actual distance among the depth element 522, the first camera 523 and the projector 524 has a large error due to multiple assembling, and thus the actual distance has a large difference from a required distance, thereby affecting the shooting performance of the imaging assembly 52. Moreover, the distance among the depth element 522, the first camera 523 and the projector 524 needs to be controlled with high precision, which brings great difficulties to assembling and thus is adverse to assembling.

In the present application, the depth element 522, the first camera 523 and the projector 524 of the imaging assembly 52 are arranged on the same bracket 521 together, such that the mounting of the plurality of elements can be completed by mounting the bracket 521 on a device where the plurality of elements are to be mounted during the mounting of the plurality of elements, which improves the mounting efficiency.

Furthermore, as illustrated in FIG. 1, the first camera 523 is located between the depth element 522 and the projector 524. By limiting the first camera 523 between the depth element 522 and the projector 524, the first camera 523 and the depth element 522 are separated by a connecting portion 5211, such that it is ensured that there is no optical crosstalk between the first camera 523 and the depth element 522, and also, the first camera 523 is arranged closer to the depth element 522 than the projector 524, such that it is ensured that there is an image information overlap between the first camera 523 and the depth element 522 along a short distance in the Z direction. Thus, the human face can also be recognized when the human face is close to the electronic device 100, which further improves reliability of face recognition by means of the imaging assembly 52. Furthermore, as illustrated in FIG. 1, the imaging assembly 52 further includes a fill light 525, the fill light 525 is arranged adjacent to the depth element 522, and the depth element 522 is located between the fill light 525 and the first camera 523. In some embodiments, as the depth element 52 is the infrared camera, and the fill light 525 actually reinforces a light intensity of the depth element 522, the fill light 525 may be an infrared fill light. By providing the fill light 525 to further fill lights to the depth element 522, the depth element 522 can capture the depth image information with higher precision, which thus improves the reliability of the imaging assembly 52.

Meanwhile, since the depth element 522 is arranged closer to the first camera 523 than the fill light 525, it is ensured that there is an image information overlap between the first camera 523 and the depth element 522 along a short distance in the Z direction, such that the human face can also be recognized when the human face is close to the electronic device 100, which further improves reliability of face recognition by means of the imaging assembly 52.

As illustrated in FIG. 1, the fill light 525, the depth element 522, the first camera 523 and the projector 524 are arranged on the bracket 521 in sequence.

Figure 2:
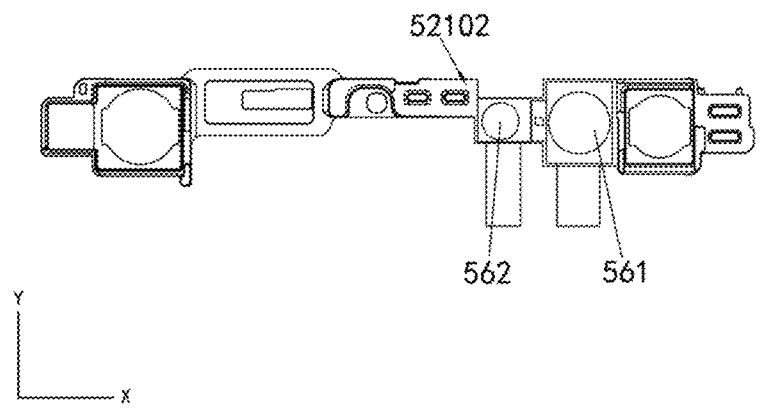
FIG. 2 is a schematic view of the electronic assembly in FIG. 1 from another angle.

In some embodiments, as illustrated in FIG. 1 and FIG. 2, the bracket 521 is substantially elongated. The fill light 525, the depth element 522, the first camera 523 and the projector 524 are arranged along a length extending direction of the bracket 521, i.e. the X direction. The bracket 521 has a first face 52101 and a second face 52102 facing away from the first face 52101, and a side face connected between the first face 52101 and the second face 52102 and adjoining the first face 52101 and the second face 52102.

As illustrated in FIG. 1, the bracket 521 includes a first fixing portion 5212, a connecting portion 5211 and a second fixing portion 5213 which are connected in sequence along the X direction. The depth element 522 is arranged on the first fixing portion 5212, and the first camera 523 and the projector 524 are arranged on the second fixing portion 5213, that is, the depth element 522 is spaced apart from the first camera 523 by the connecting portion 5211, which prevents the optical crosstalk due to a too small distance between the first camera 523 and the depth element 522. The fixing portions of the bracket 521 allow the depth element 522, the first camera 523 and the projector 524 to be spaced apart from one another at desired distances, thereby reducing difficulties of assembling. Also, since the depth element 522, the first camera 523 and the projector 524 are arranged on the bracket 521 together, it is only required to mount the bracket 521 when the imaging assembly 52 needs to be mounted, which improves the assembling efficiency.

Furthermore, as illustrated in FIG. 1, the bracket 521 further includes a third fixing portion 5214, the third fixing portion 5214 is arranged adjacent to the first fixing portion 5212, and the first fixing portion 5212 is located between the connecting portion 5211 and the third fixing portion 5214. The fill light 525 is fixed to the third fixing portion 5214, and configured to fill lights to the depth element 522.

By limiting the first fixing portion 5212 between the connecting portion 5211 and the third fixing portion 5214, the depth element 522 is closer to the first camera 523 than the fill light 525, it is ensured that there is an image information overlap between the first camera 523 and the depth element 522 along a short distance in the Z direction, such that the human face can also be recognized when the human face is close to the electronic device 100, which further improves reliability of face recognition by means of the imaging assembly 52.

The third fixing portion 5214, the first fixing portion 5212, the connecting portion 5211 and the second fixing portion 5213 are connected in sequence along the X direction. Correspondingly, the fill light 525, the depth element 522, a first function element, the first camera 523 and the projector 524 are fixed in sequence to the third fixing portion 5214, the first fixing portion 5212, the connecting portion 5211 and the second fixing portion 5213. In some embodiments, the fill light 525 is arranged on the third fixing portion 5214, the depth element 522 is arranged on the first fixing portion 5212, and the first function element is arranged on the connecting portion 5211. Further, both the first camera 523 and the projector 524 are arranged on the second fixing portion 5213.

Figure 3:
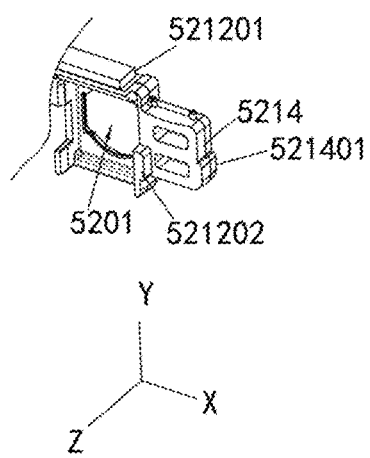
FIG. 3 is a schematic view of a first fixing portion in FIG. 1.

In an embodiment, as illustrated in FIG. 3, the first fixing portion 5212 has a special structure as follows. The first fixing portion 5212 includes a first fixing plate 521201 and a first annular protrusion 521202. The first fixing plate 521201 defines a first hollow-out part 5201, the first annular protrusion 521202 protrudes from the first fixing plate 521201, and the first annular protrusion 521202 has an inner chamber in communication with the first hollow-out part 5201. The depth element 522 is received in the inner chamber of the first annular protrusion 521202. The depth element 522 is configured to capture the depth image information through the first hollow-out part 5201. Certainly, in other embodiments, the first fixing portion 5212 may be a flat plate, that is, the depth element 522 is directly fixed to the first fixing portion 5212.

In some embodiments, as illustrated in FIG. 1 and FIG. 3, the first fixing portion 5212 is provided with the first annular protrusion 521202 configured to receive the depth element 522, and the depth element 522 can capture the depth image information from the outside through the first hollow-out part 5201. That is, most parts of the depth element 522 is fixed to the first fixing portion 5212, and the first annular protrusion 521202 surrounds the depth element 522, to prevent the depth element 522 from impact. The first fixing portion 5212 of this structure can fix the depth element 522 in a better way, thereby improving the reliability of the imaging assembly 52.

It should be understood that, as illustrated in FIG. 3, the first annular protrusion 521202 is in a shape similar to that of the depth element 522, which guarantees that the depth element 522 can be wrapped by the first annular protrusion 521202 in a better way. The first hollow-out part 5201 is a substantially round through hole, a shape of the round through hole matches with that of a lens of the depth element 522, and the lens of the depth element 522 is right opposite to the first hollow-out part 5201, such that the lens in the depth element 522 can capture the depth image information from the outside through the first hollow-out part 5201.

It should be understood that, as illustrated in FIG. 3, the first annular protrusion 521202 protrudes from the second face 52102 of the bracket 521. Correspondingly, a direction (i.e. an incident light direction) of the depth element 522 capturing the depth image information is a direction from the first face 52101 to the second face 52102. A part of the first annular protrusion 521202 protrudes relative to the connecting portion 5211 along the Y direction. In other words, the first annular protrusion 521202 occupies approximately 90% areas of the first fixing portion 5212.

In an embodiment, as illustrated in FIG. 3, the first annular protrusion 521202 may have same or different sizes at different positions along the Z direction.

The first fixing portion 5212 of the above structure can receive the depth element 522 therein, so as to prevent the depth element 522 from impact and displacement. The first annular protrusion 521202 of the first fixing portion 5212 has an end facing away from the first fixing plate 521201, and this end defines an opening therein. The opening allows the depth element 522 to be electrically coupled to a first flexible circuit board 91, which facilitates the arrangement of wires of the depth element 522.

It should be understood that, as illustrated in FIG. 3, the third fixing portion 5214 is arranged adjacent to the first fixing portion 5212, the third fixing portion 5214 has a plate shape, the third fixing portion 5214 has a fill-light fixing face 521401, and the fill light 525 is fixed to the fill-light fixing face 521401.

In some embodiments, the fill light 525 has a small size, and therefore the fill light 525 is directly arranged on the fill-light fixing face 521401. The fill-light fixing face 521401 is actually a part of the first face 52101 of the bracket 521. The fill light 525 emits light in a direction from the second face 52102 to the first face 52101, thereby filling light to the depth element 522.

The second face 52102 of the bracket 521 has a portion corresponding to the fill-light fixing face 521401, and this portion defines two first grooves along the Y direction. The two first grooves can reduce a weight of the bracket 521.

The second fixing portion 5213 has a specific structure as follows.

Figure 4:
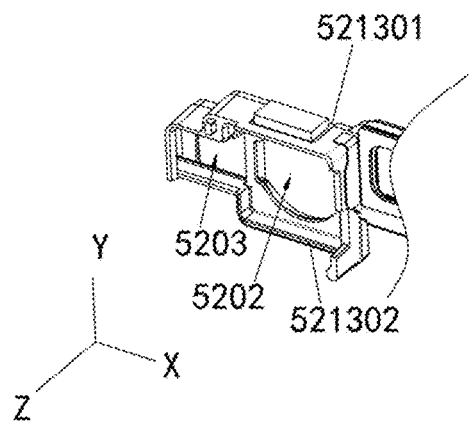
FIG. 4 is a schematic view of a second fixing portion in FIG. 1.

In an embodiment, as illustrated in FIG. 4, the second fixing portion 5213 includes a second fixing plate 521301 and a second annular protrusion 521302, and the second fixing plate 521301 defines a second hollow-out part and a third hollow-out part spaced apart from each other. The second annular protrusion 521302 protrudes from the second fixing plate 521301, and the second annular protrusion 521302 has an inner chamber in communication with the second hollow-out part 5202 and the third hollow-out part 5203. The first camera 523 and the projector 524 are received in the inner chamber of the second annular protrusion 521302. The first camera 523 is configured to capture the first hue image information through the second hollow-out part 5202, and the projector 524 is configured to conduct projection through the third hollow-out part 5203.

In some embodiments, as illustrated in FIG. 1 and FIG. 4, the second fixing portion 5213 has the second annular protrusion 521302 configured to receive the first camera 523 and the projector 524. The first camera 523 can capture the first hue image information from the outside through the second hollow-out part 5202, and the projector 524 can project a dot matrix to the outside through the third hollow-out part 5203. The second annular protrusion 521302 surrounds the first camera 523 and the projector 524, so as to prevent the first camera 523 and the projector 524 from impact or displacement. The second fixing portion 5213 of this structure can fix the first camera 523 and the projector 524 in a better way, and the first camera 523 and the projector 524 are received in the inner chamber of the second annular protrusion 521302 together, which reduces additional protrusions and thus reduces the weight of the bracket 521.

As illustrated in FIG. 4, the second annular protrusion 521302 has a shape substantially similar to outlines of the first camera 523 and the projector 524 in a circumferential direction, such that the second annular protrusion 521302 can surround and limit the first camera 523 and the projector 524 in a better way. The second hollow-out part 5202 is a substantially round through hole, and a shape of the round through hole matches with that of the first camera 523. A lens of the first camera 523 is right opposite to the second hollow-out part 5202, such that the lens in the first camera 523 can capture the first hue image information from the outside through the second hollow-out part 5202. The third hollow-out part 5203 is a substantially rectangular through hole, such that the projector 524 can project a light spot through the third hollow-out part 5203.

It should be understood that, as illustrated in FIG. 1 and FIG. 4, the second annular protrusion 521302 protrudes from the second face 52102 of the bracket 521. Correspondingly, a direction (i.e. an incident light direction) of the first camera 523 capturing the first hue image information is a direction from the first face 52101 to the second face 52102. A part of the second annular protrusion 521302 protrudes relative to the connecting portion 5211 along the Y direction. In other words, the second annular protrusion 521302 occupies approximately 90% areas of the second fixing portion 5213.

In an embodiment, the second annular protrusion 521302 may have same or different sizes at different positions along the Z direction.

The second fixing portion 5213 of the above structure can receive the first camera 523 and the projector 524 therein, so as to prevent the first camera 523 and the projector 524 from impact and displacement. The second annular protrusion 521302 of the second fixing portion 5213 has an end facing away from the second fixing plate 521301, and this end defines an opening therein. The opening allows the first camera 523 and the projector 524 to be electrically coupled to a second flexible circuit board 92 and a third flexible circuit board correspondingly, which facilitates the arrangement of wires of the first camera 523 and the projector 524. Moreover, the first camera 523 and the projector 524 are received in the inner chamber of the second annular protrusion 521302 together, which reduces the additional protrusions and thus reduces the weight of the bracket 521.

Figure 5:
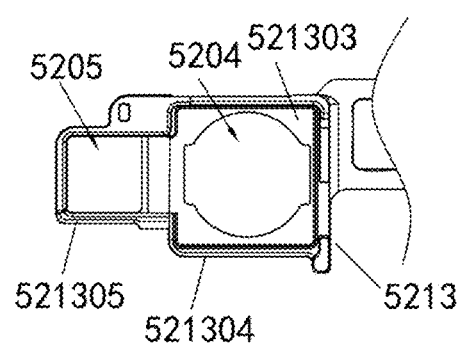
FIG. 5 is a schematic view of another second fixing portion in FIG. 1.

In another embodiment, as illustrated in FIG. 5, the second fixing portion 5213 includes a third fixing plate 521303, a third annular protrusion 521304 and a fourth annular protrusion 521305. The third fixing plate 521303 defines a fourth hollow-out part 5204 and a fifth hollow-out part 5205 spaced apart from each other. The third annular protrusion 521304 and the fourth annular protrusion 521305 protrude from the third fixing plate 521303 and are spaced apart from each other. The third annular protrusion 521304 has an inner chamber in communication with the fourth hollow-out part 5204, and the fourth annular protrusion 521305 has an inner chamber in communication with the fifth hollow-out part 5205. The first camera 523 is received in the inner chamber of the third annular protrusion 521304 and the projector 524 is received in the inner chamber of the fourth annular protrusion 521305. The first camera 523 is configured to capture the first hue image information through the fourth hollow-out part 5204, and the projector 524 is configured to conduct projection through the fifth hollow-out part 5205.

As illustrated in FIG. 5, this second fixing portion 5213 has a structure substantially same with that of the above second fixing portion 5213, but mainly differs in that two protrusions spaced apart from each other, i.e. the third annular protrusion 521304 and the fourth annular protrusion 521305 of this second fixing portion 5213 replace the second annular protrusion 521302 of the above second fixing portion 5213. One annular protrusion receives one element therein, which further prevents the first camera 523 and the projector 524 from impact.

For shapes of the third annular protrusion 521304, the fourth annular protrusion 521305, the fourth hollow-out part 5204 and the fifth hollow-out part 5205, reference can be made to those of the second annular protrusion 521302, the second hollow-out part 5202 and the third hollow-out part 5203 of the above second fixing portion 5213, which thus will not be described herein.

This second fixing portion 5213 can further prevent the first camera 523 and the projector 524 from impact by receiving one element in one annular protrusion.

In the above imaging assembly 52, the depth element 522 is arranged on the first fixing portion 5212 of the bracket 521, the first camera 523 and the projector 524 are arranged on the second fixing portion 5213 of the bracket 521, and the connecting portion 5211 between the first fixing portion 5212 and the second fixing portion 5213 is configured to be provided with the first function element. Thus, the plurality of elements are mounted on the bracket 521 together, such that the mounting of the above plurality of elements can be completed by mounting the bracket 521 on a device where the plurality of elements are to be mounted during the mounting of the plurality of elements, which improves the mounting efficiency.

The arrangement of the shooting assembly 56 on the bracket 521 will be illustrated below.

As illustrated in FIG. 1, the connecting portion 5211 of the bracket 521 allows the first fixing portion 5212 and the second fixing portion 5213 to be spaced apart from each other by a certain distance along the X direction, such that there is no optical crosstalk between the depth element 522 arranged on the first fixing portion 5212 and the first camera 523 arranged on the second fixing portion 5213, and thus it is guaranteed that the two can capture image information exactly. Moreover, the shooting assembly 56 acquires images in an opposite direction and is arranged on the connecting portion 5211 of the bracket 521. Thus, on the premise that there is no optical crosstalk to the depth element 522 and the first camera 523, the shooting assembly 56 effectively utilizes the connecting portion 5211, thereby improving the utility rate of space of the bracket 521.

It should be understood that, as illustrated in FIG. 1, the connecting portion 5211 may further define a first receiving hole 521101. The arrangement of the first receiving hole 521101 allows the bracket 521 to be further provided with other function elements besides the imaging assembly 52 and the shooting assembly 56, such that the space occupation can be reduced when the imaging assembly 52, the shooting assembly 56 and other elements are mounted, thereby improving the utility rate of space.

The arrangement of the shooting assembly 56 on the bracket includes but is not limited to the following embodiments.

Figure 6:
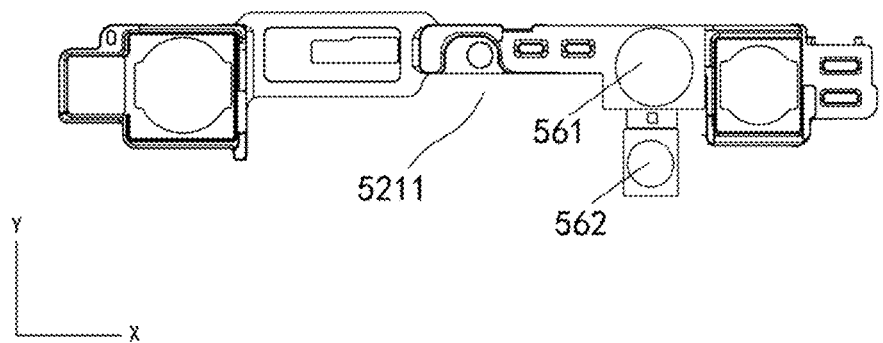
FIG. 6 is a schematic view of an arrangement of a shooting assembly on a connecting portion in FIG. 1.

In an embodiment, as illustrated in FIG. 1, the shooting assembly 56 is arranged on the connecting portion 5211 and adjacent to the first receiving hole 521101 along the X direction. A first camera 561 and a second camera 562 may be arranged side by side along the X direction. Certainly, in other embodiments, as illustrated in FIG. 6, the first camera 561 and the second camera 562 may be arranged side by side along the Y direction.

Figure 7:
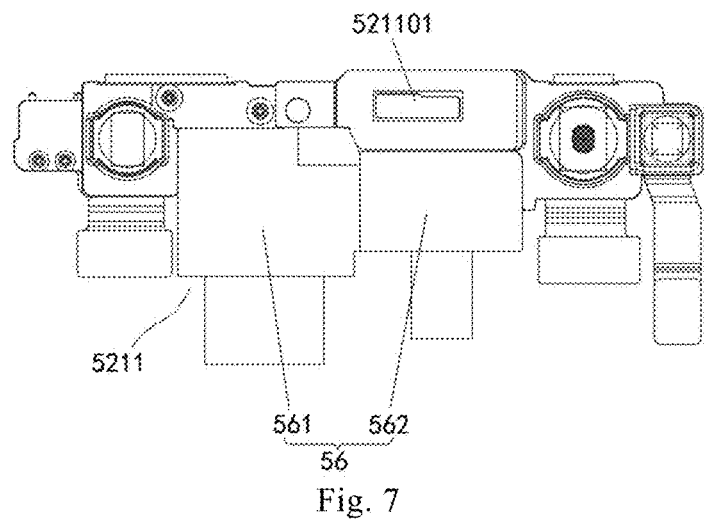
FIG. 7 is a schematic view of another arrangement of the shooting assembly on the connecting portion in FIG. 1.

In another embodiment, as illustrated in FIG. 7, the shooting assembly 56 is arranged to the connecting portion 5211 and side by side with the first receiving hole 521101 along the Y direction.

In some embodiments, the second camera 561 is a telephoto camera, and the third camera 562 is a wide angle camera. Certainly, in other embodiments, the second camera 561 may be a color camera, and the third camera 562 may be a black and white camera.

In other words, the first camera 523 and the second camera 561 are actually rear cameras, for achieving rear photographing functions of the rear cameras.

The connecting portion 5211 has a structure including but being not limited to the following embodiments.

Figure 8:
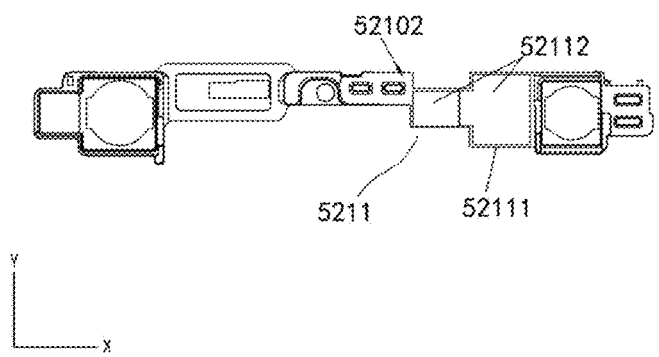
FIG. 8 is a schematic view of a bracket where the shooting assembly in FIG. 2 is arranged.

In an embodiment, as illustrated in FIG. 1 and FIG. 8, the connecting portion 5211 includes a connecting plate 52111 and two adjacent embedding grooves 52112 recessed in the connecting plate 52111. The second camera 561 and the third camera 562 are embedded in the two embedding grooves 52112 correspondingly.

In some embodiments, as illustrated in FIG. 8, the two embedding grooves 52112 are recessed in the second face 52102 of the connecting portion 5211, such that the second camera 561 and the third camera 562 can be embedded in the two embedding grooves 52112 correspondingly, and thus the shooting assembly 56 and the imaging assembly 52 can be arranged on the same bracket 521.

In some embodiments, the embedding grooves 52112 have shapes matching with those of the second camera 561 and the third camera 562, for example substantially rectangle shapes.

The connecting portion 5211 of this structure makes it easy to machine the bracket 521.

Figure 9:
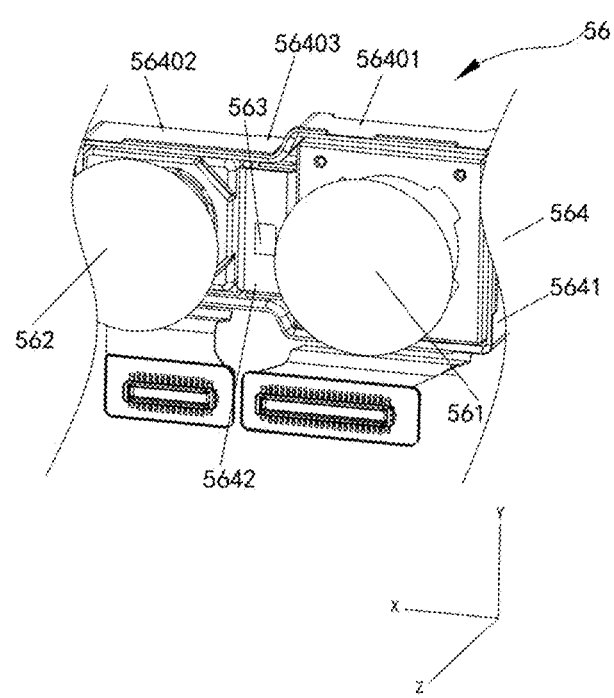
FIG. 9 is a schematic view of the shooting assembly in FIG. 2.
Figure 10:
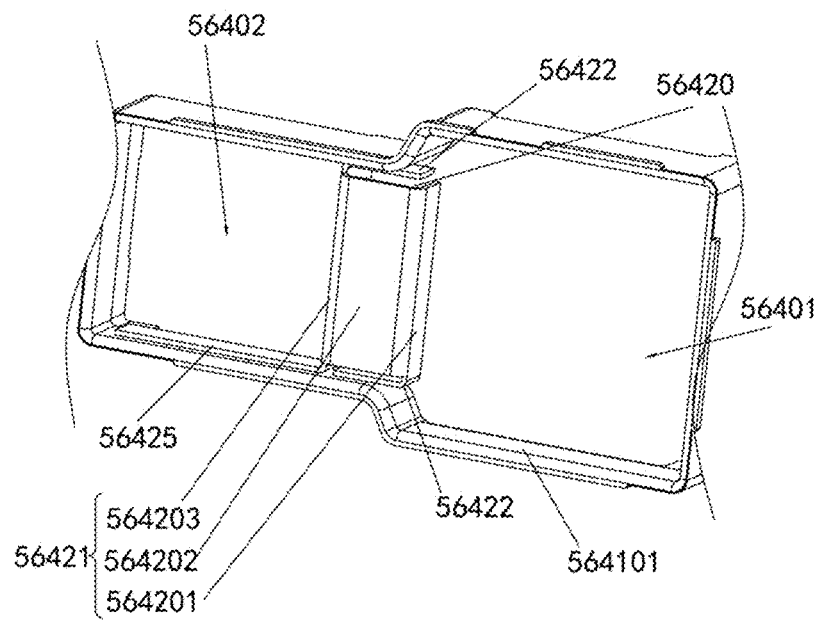
FIG. 10 is a schematic view of a connecting portion in FIG. 2.

In another embodiment, as illustrated in FIG. 1, FIG. 9 and FIG. 10, the connecting portion 5211 includes a frame body 641 and a separator 5642. The separator 5642 is arranged inside the frame body 5641, such that a space inside the frame body 5641 is separated into a first receiving space 56401 and a second receiving space 56402. The second camera 561 is received in the first receiving space 56401, and the third camera 562 is received in the second receiving space 56402.

In some embodiments, as illustrated in FIG. 10, the frame body 5641 has a substantially long rectangle shape. An outline of the frame body 5641 corresponds to those of the first camera 523 and the second camera 561. The separator 5642 is substantially arranged in a middle area of the frame body 5641, such that the frame body 5641 is separated into two spaces. In other words, the separator 5642 separates the frame body 5641 into the first receiving space 56401 and the second receiving space 56402 which are arranged side by side along the X direction.

As illustrated in FIG. 1 and FIG. 10, the first receiving space 56401 and the second receiving space 56402 each have two openings. The receiving spaces can surround the second camera 561 and the third camera 562 in a batter way, which prevents the second camera 561 and the third camera 562 from impact and thus improves the reliability of the shooting assembly 56. Because of the two openings, the flexible circuit boards can be directly arranged to the cameras, which facilitates the arrangement of wires of the shooting assembly 56, and also lights can enter the cameras. Correspondingly, the second camera 561 is electrically coupled to a first camera circuit board 94, the third camera 562 is electrically coupled to a second camera circuit board 95, and both the first camera circuit board 94 and the second camera circuit board 95 are flexible circuit boards.

In the connecting portion 5211 of this structure, the space inside the frame body is separated by the separator 5642 into two spaces to receive the second camera 561 and the third camera 562, such that a compact structure is caused after the second camera 561 and the third camera 562 are arranged to the connecting portion 5211.

Furthermore, as illustrated in FIG. 9, the separator 5642 may be further provided with a flash 563. The flash 563 is arranged between the second camera 561 and the third camera 562. The flash is configured to fill lights to the second camera 561 and the third camera 562, which is beneficial to image information acquisitions of the second camera 561 and the third camera 562. The flash 563 is also one of the elements included by the shooting assembly 56.

As illustrated in FIG. 10, the separator 5642 includes a carrier plate 56421 and two fixing plates 56422. The two fixing plates 56422 are connected to two ends of the carrier plate 56421 correspondingly, and also fixed to an inner side face 564101 of the frame body 56411. The carrier plate 56421 is used for arrangement of the flash 563.

In some embodiments, the carrier plate 56421 includes a first support end and a second support end facing away from each other along the Y direction. The two fixing plates 56422 have first ends connected to the first support end and the second support end correspondingly and bended therefrom, and second ends extending away from the first ends along the X direction. The second ends of the two fixing plates 56422 extend in opposite directions. The two fixing plates 56422 abutted against the frame body 5641, such that the carrier plate 56421 is fixed in the frame body 5641, and the space inside the frame body 5641 is separated into two spaces.

In other words, the separator 5642 is detachably connected to the frame body 5641, and the separator 5642 can be mounted in the frame body 5641 by adjusting a bending angle between the fixing plate 56422 and the carrier plate 56421. The separator 5642 has good applicability. It should be understood that a glue layer may be provided at a position where the fixing plate 56422 and the frame body 5641 are connected to further enhance the strength of connection between the fixing plate 56422 and the frame body 5641.

It should be understood that, as illustrated in FIG. 10, the carrier plate 56421 includes a second plate 564201, a first plate 564202 and a third plate 564203 which are connected in sequence, and the first plate 564202 is used for arrangement of the flash 563. In other words, the flash 563 may be electrically coupled to a flexible circuit board and then is carried on the first plate 564202. The second plate 564201 and the third plate 564203 are connected to two sides of the first plate 564202 correspondingly and bent therefrom, and the second plate 564201 is opposite to the third plate 564203 to define a receiving chamber 56420.

In some embodiments, the carrier plate 56421 is substantially U-shaped. The first plate 564202, the second plate 564201 and the third plate 564203 are connected to enclose an area which is configured as the receiving chamber 56420 for receiving a driving part of the first camera 523. The first plate 564202 carries the flash 563. The flash 563 and the driving part are arranged to the first plate 564202 and face away from each other, which optimizes a structure of the connecting portion 5211, and improves the utility rate of space of the connecting portion 5211.

It should be understood that, as illustrated in FIG. 10, the separator 5642 further includes a stiffening plate 56425, the stiffening plate 56425 has an first end fixed to the carrier plate 56421 and a second end extending in a direction running away from the carrier plate 56421, and the second end of the stiffening plate 56425 is closely fitted with an inner frame wall of the frame body 5641.

In some embodiments, the first end of the stiffening plate 56425 is connected to the second support end of the carrier plate 56421 and bent therefrom, and the second end of the stiffening plate 56425 extends in the direction running away from the carrier plate 56421 until that the second end abuts against the frame body 5641. The stiffening plate 56425 can further guarantee that the separator 5642 can be fixed in the frame body 5641 in a better way.

In the above separator 5642, an integrally molded steel plate is bent to form the fixing plates 56422, and the carrier plate 56421 and the stiffening plate 56425, such that the separator 5642 can be detachably arranged in the frame body 5641. Thus, a position of the separator 5642 relative to the frame body 5641 can be flexibly adjusted. In other words, sizes of the first receiving space and the second receiving space can be adjusted by adjusting the position of the separator 5642 relative to the frame body 5641.

Figure 11:
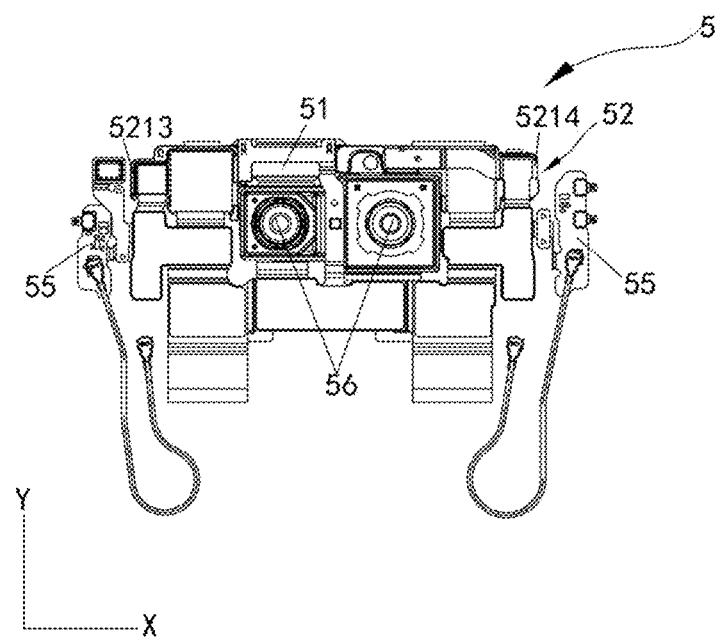
FIG. 11 is a schematic view of an electronic assembly according to a first embodiment of the present application.
Figure 12:
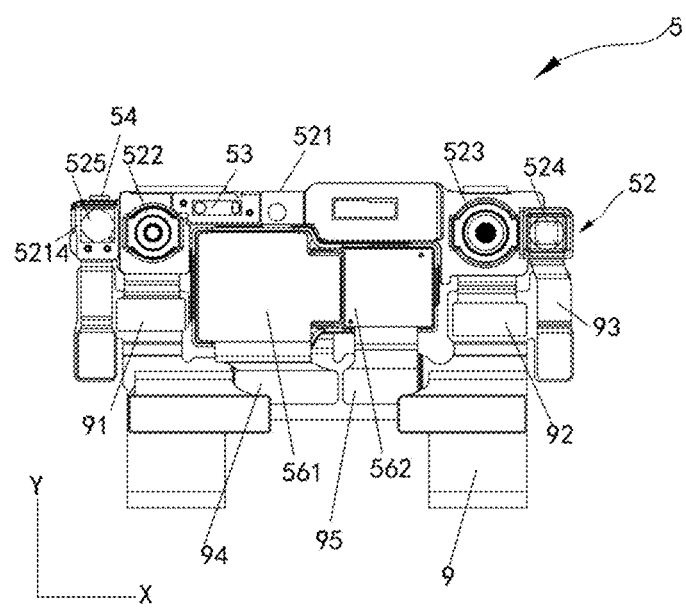
FIG. 12 is a schematic view of the electronic assembly in FIG. 11 from another angle.

Furthermore, as illustrated in FIG. 1, FIG. 11 and FIG. 12, the electronic assembly 5 further includes a receiver 51, and the receiver 51 is carried on the second face 52102 of the bracket 521. The receiver 51 has a vibration portion in communication with the first receiving hole 521101, that is, a sound signal of the receiver 51 can be transmitted into an external environment through the first receiving hole 521101.

Furthermore, as illustrated in FIG. 12, the electronic assembly 5 further includes a proximity sensing component 53, and the proximity sensing component 53 is configured to measure a distance and sense an ambient light. The proximity sensing component 53 faces away from the second camera 561, and an incident light direction of the proximity sensing component 53 is opposite to an incident light direction of the second camera 561.

It should be understood that, the proximity sensing component 53 may be arranged side by side with the second camera 561 and the third camera 562 along the Y direction as illustrated in FIG. 12. It should be understood that, as illustrated in FIG. 1, FIG. 5 and FIG. 7, the proximity sensing component 53 may be adjacent to the second camera 561 and the third camera 562 along the X direction.

In some embodiments, as illustrated in FIG. 12, the proximity sensing component 53 is also called as a three-in-one photosensitive component, the proximity sensing component 53 is mainly configured to sense an ambient brightness to control a backlight display, i.e. automatically adjust a screen to have the optimum brightness with clearness and comfort. The proximity sensing component also can turn on/off the screen and enable/disable a touch function based on a distance when sensing that an object approaches, and the distance which can be sensed reaches up to 10 centimeters. For example, the screen is brightened in the sun and dimmed in the dark. Further, the screen is automatically turned off and the touch function is automatically disabled when the face approaches for conversation, while the screen is automatically turned on and the touch function is automatically enabled when the face leaves after conversation. Moreover, the proximity sensing component also can interrupt a notification and adjust a sensing interval, which can further save the overall power consumption, and thus effectively solve the problem of power consumption which is mostly concerned by a portable device.

As illustrated in FIG. 12, the proximity sensing component 53 is arranged between the depth element 522 and the receiver 51. The proximity sensing component 53 is arranged on the first face 52101 of the bracket 521. By providing the proximity sensing component 53 on the connecting portion 5211 of the bracket 521, the utilization rate of the connecting portion 5211 can be further improved, such that the electronic assembly 5 has a compact arrangement. Moreover, since the receiver 51, the proximity sensing component 53, the imaging assembly 52 and the shooting assembly 56 are arranged on the bracket 521 together, it is only required to control the accuracy of mounting the bracket 521 during mounting, and the multiple mounting is needless, such that a large error in the mounting accuracy caused by the multiple mounting of the elements can be avoided.

In some embodiments, the second face 52102 of the bracket 521 defines a second groove at a position corresponding to the proximity sensing component 53, which further reduces the weight of the bracket 521.

Furthermore, as illustrated in FIG. 12, the electronic assembly 5 further includes a light sensor 54. The light sensor 54 is arranged on the third fixing portion 5214, and a light reception direction of the light sensor 54 intersects with the direction of the depth element 522 capturing the depth image information.

In some embodiments, the light sensor 54 is arranged to a side face of the bracket 521 and located on the third fixing portion 5214. The light sensor 54 receives light along the Y direction.

By arranging the light sensor 54 on the bracket 521, the utilization rate of the bracket 521 can be further improved, such that the electronic assembly 5 has a compact arrangement. Moreover, since the light sensor 54, the receiver 51, the proximity sensing component 53, the imaging assembly 52 and the shooting assembly 56 are arranged on the bracket 521 together, it is only required to control the accuracy of mounting the bracket 521 during mounting, and the multiple mounting is needless, such that a large error in the mounting accuracy caused by that the multiple mounting of the elements can be avoided.

Furthermore, as illustrated in FIG. 11, the electronic assembly 5 further includes two antenna components 55, and the two antenna components 55 are disposed at two opposite sides of the bracket 521 correspondingly. Further, the two antenna components 55 are arranged adjacent to the third fixing portion 5214 and the second fixing portion 5213 correspondingly.

In some embodiments, the two antenna components 55 are arranged adjacent to the third fixing portion 5214 and the second fixing portion 5213 correspondingly. Since the two antenna components 55 are compactly arranged at the two sides of the bracket 521 along the X direction, the arrangement of the electronic assembly 5 is optimized.

In the electronic assembly 5 and the electronic device 100 provided by the present application, the depth element 522, the first camera 523, the second camera 561 and the projector 524 are mounted on the bracket 521 together, such that the mounting of the plurality of elements can be completed by mounting the bracket 521 on a device where the plurality of elements are to be mounted during the mounting of the plurality of elements, which improves the mounting efficiency.

Figure 13:
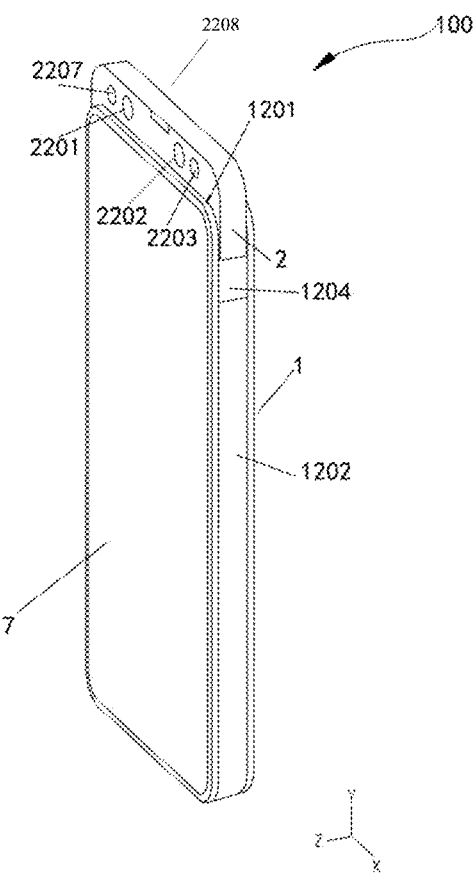
FIG. 13 is a schematic view of an electronic device according to an embodiment of the present application.

As illustrated in FIG. 13, an electronic device 100 provided by an embodiment of the present application is shown. The electronic device 100 may be any smart electronic device, such as a tablet personal computer, a mobile phone, a camera, a personal computer, a notebook computer, a vehicle-mounted device, a wearable device, etc. For convenience of description, the X direction of the bracket 521 corresponds to a width direction of the electronic device 100, the Y direction of the bracket 521 corresponds to a length direction of the electronic device 100, and the Z direction of the bracket 521 corresponds to a thickness direction of the electronic device 100.

As illustrated in FIG. 13, the electronic device 100 provided by the embodiment of the present application includes a middle frame 1 and a sliding base 2. The sliding base 2 is slidably connected to the middle frame 1, such that the electronic device 100 can stretch the sliding base 2 out of the middle frame 1 and retract the sliding base 2 into the middle frame 1 according to a user's actual requirements. The sliding base 2 receives the electronic assembly 5 therein, and the sliding base 2 is slidable relative to the middle frame 1, such that the electronic assembly 5 can slide out when needs to be used, and thus the limit to the screen-to-body ratio of a display screen of the electronic device 100 due to the use of the electronic assembly 5 can be avoided, which is beneficial to increase of the screen-to-body ratio of the electronic device 100.

In some embodiments, as illustrated in FIG. 13 and FIG. 15, the electronic device 100 includes the middle frame 1, the sliding base 2, a guide mechanism 4, a drive mechanism 3 and the electronic assembly 5 received in the sliding base 2. The middle frame 1 includes a pair of opposite side end faces 1202 and a top end face 1201 connected between the pair of side end faces 1202. The top end face 1201 defines a receiving groove 1204, and the receiving groove 1204 passes through the pair of side end faces 1202. The sliding base 2 is received in the receiving groove 1204 and slidably connected to the middle frame 1 through the drive mechanism 3. The guide mechanism 4 is arranged between the sliding base 2 and the middle frame 1, such that the sliding base 2 is driven by the drive mechanism 3 to extend out of or be received in the receiving groove 1204 along a guide direction of the guide mechanism 4. The sliding base 2 is provided with a first function portion 2201, a second function portion 2202 and a third function portion 2203 in a same face, and a fourth function portion 2204 facing away from the first function portion 2201. The depth element 522 captures the depth image information through the first function portion 2201, the first camera 523 captures the first hue image information through the second function portion 2202, the projector 524 conducts projection through the third function portion 2203, and the second camera 561 captures the second hue image information through the fourth function portion 2204.

It should be understood that, since the shooting assembly 56 further includes the third camera 562, the sliding base 2 is provided with a fifth function portion 2205, and the fifth function portion 2205 and the fourth function portion 2204 are arranged in the same face.

It should be understood that, as illustrated in FIG. 15, the electronic device 100 further includes a main board 6, and the main board 6 is provided with an image processing chip. The electronic assembly 5 is electrically coupled to the main board 6, so as to establish a date transmission channel with the main board 6.

A main flexible circuit board 9 can be winded along with sliding of the sliding base 2, such that it is ensured that the sliding base 2 can slide out of or retract into the receiving groove 1204 reliably.

When the electronic device 100 is used for shooting from the rear, it is only required to stretch the sliding base 2 out of the receiving groove 1204, the second camera 561 and the third camera 562 acquire image information through the fourth function portion 2204 and the fifth function portion 2205 correspondingly, and thus the shooting function can be achieved. When the electronic device 100 is not used for shooting from the rear, it is only required to retract the sliding base 2 into the receiving groove 1204, and thus the shooting assembly 56 is received and stored.

When the electronic device 100 is used for face recognition, it is only required to stretch the sliding base 2 out of the receiving groove 1204, and the projector 524 emits an infrared light which is specially modulated to a subject to be shot through the third hollow-out part 5203 (the fifth hollow-out part 5205) and the third function portion 2203 in sequence. The depth element 522 receives the infrared light reflected back by the subject to be shot through the first function portion 2201 and the first hollow-out part 5201 in sequence, and obtains the space information of the subject to be shot via calculation. The first camera 523 receives the light reflected back by the subject to be shot through the second function portion 2202 and the second hollow-out part 5202 (the fourth hollow-out part 5204) in sequence, so as to shoot a color image of the subject to be shot. The image information captured by the depth element 522 and the first camera 523 is sent to the image processing chip. The image processing chip combines the depth image information with the first hue image information, and obtains a target image via algorithm processing. The target image may be a color image with information.

Figure 16:
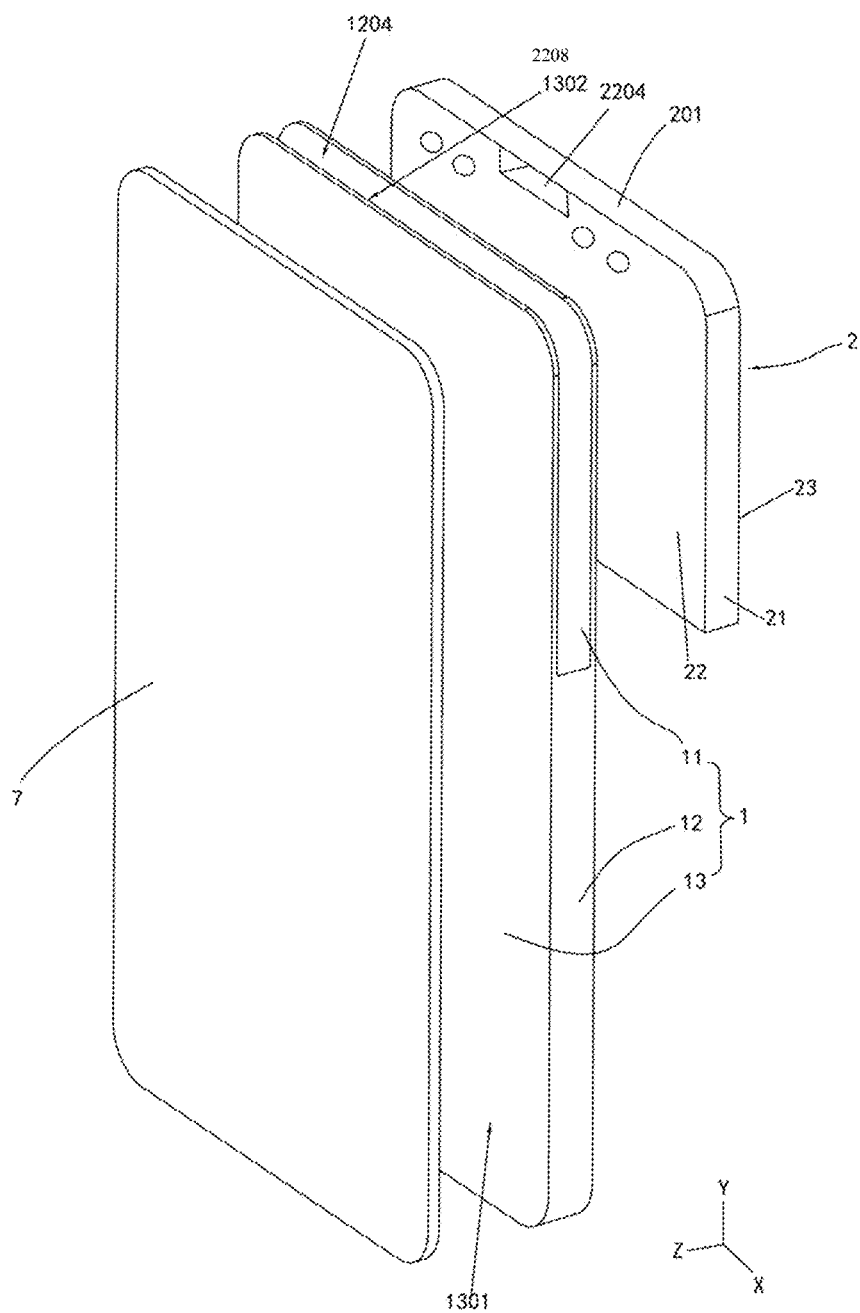
FIG. 16 is an exploded view of the electronic device in FIG. 13.

In some embodiments, as illustrated in FIG. 13 and FIG. 16, the middle frame 1 includes a middle plate 11 and a side frame 12 surrounding the middle plate 11. The side frame 12 is covered by a display element 7 to form a complete housing of the electronic device 100. As illustrated in FIG. 16, the side frame 12 includes the pair of opposite side end faces 1202 as well as the top end face 1201 and a bottom end face which are connected between the pair of side end faces 1202. In other words, the side frame 12 has a shape of a substantially rectangular frame. The side end faces 1202 also serve as long edges of the electronic device 100. Generally, the side end faces 1202 are used for arrangement of a volume key, a card support and a card seat of the electronic device 100. The top end face 1201 and the bottom end face serve as short edges of the electronic device 100. Generally, the bottom end face is used for arrangement of an earpiece and a speaker of the electronic device 100.

Furthermore, also as illustrated in FIG. 13 and FIG. 16, the receiving groove 1204 is defined in the top end face 1201 of the side frame 12, such that when the sliding base 2 is slidably connected to the middle frame 1, the display element 7, the sliding base 2 and the middle plate 11 of the electronic device 100 form a sandwich structure. This structure guarantees that the display element 7 and the middle plate 11 can protect the sliding base 2 therebetween from damage, when the electronic device 100 falls off or is impacted by an external force.

For ease of understanding, as illustrated in FIG. 15, the inner space of the middle frame 1 apart from the receiving groove 1204 is defined as an inner chamber of the middle frame 1, that is, the complete inner space of the middle frame 1 consists of the receiving groove 1204 and the inner chamber.

In some embodiments, as illustrated in FIG. 13, a length of the receiving groove 1204 along the X direction is the same with that of the middle frame 1 along the X direction. In other words, portions of the two side end faces 1202 of the side frame 12 adjacent to the top end face 1201 define two openings due to the existence of the receiving groove 1204, such that the sliding base 2 corresponding to the receiving groove 1204 has a large size to receive more elements. Accordingly, the more the elements in the sliding base 2, the less the influence on the screen-to-body ratio of the display screen of the electronic device 100 due to the elements.

Figure 14:
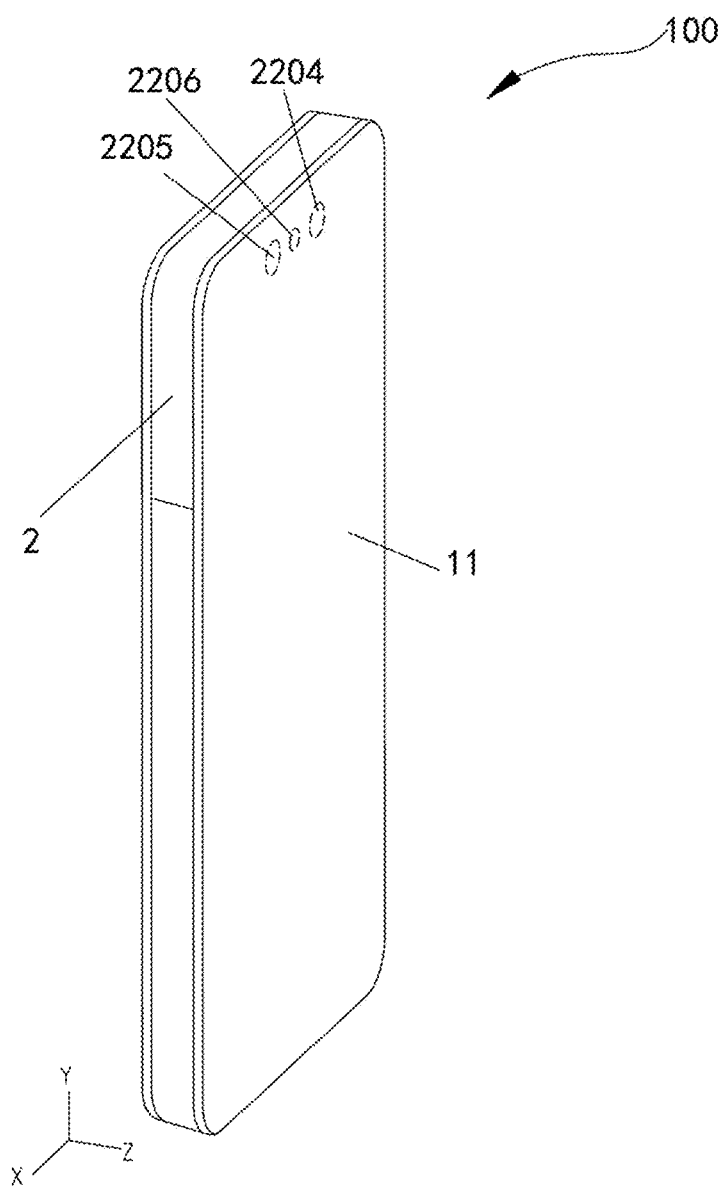
FIG. 14 is a schematic view of the electronic device in FIG. 13 from another angle.

In some embodiments, as illustrated in FIG. 16, the sliding base 2 has a size corresponding to that of the receiving groove 1204, that is, the sliding base 2 fills the whole receiving groove 1204. As illustrated in FIG. 13, when a certain element of the electronic assembly 5 in the sliding base 2 needs to work, the sliding base 2 can be slid accordingly, such that the sliding base 2 is in a stretched state. As illustrated in FIG. 13, when the function of the imaging assembly 52 is desired, the sliding base 2 is slid, such that the sliding base 2 is in the stretched state, and thus the recognition function of the imaging assembly 52 can be achieved through corresponding function portions. As illustrated in FIG. 14, when the function of the imaging assembly 52 is undesired, the sliding base 2 is slid, such that the sliding base 2 is in a retracted state, thus facilitating storage of the electronic device 100.

It should be understood that, as illustrated in FIG. 16, the sliding base 2 includes a sliding frame 21, a first sliding plate 22 and a second sliding plate 23. The sliding frame 21 is made of conductive materials. The first sliding plate 22 and the second sliding plate 23 cover two sides of the sliding frame 21 correspondingly, so as to define an inner chamber of the sliding base 2 for receiving a plurality of functional elements. The first sliding plate 22 and the second sliding plate 23 are made of light transparent materials.

In some embodiments, as illustrated in FIG. 13 and FIG. 14, the sliding base 2 further includes a sixth function portion 2206 corresponding to the flash 563 and a seventh function portion 2207 corresponding to the fill light 525, the flash 563 is configured to fill lights to the second camera 561 and the third camera 562 through the sixth function portion 2206, and the fill light 525 is configured to fill lights to the depth element 522 through the seventh function portion 2207. Moreover, an area of the sliding base 2, apart from the first function portion 2201, the second function portion 2202, the third function portion 2203, the fourth function portion 2204, the fifth function portion 2205, the sixth function portion 2206 and the seventh function portion 2207, is provided with a shading ink. In other words, light only can pass through the first function portion 2201, the second function portion 2202, the third function portion 2203, the fourth function portion 2204, the fifth function portion 2205, the sixth function portion 2206 and the seventh function portion 2207.

In some embodiments, as illustrated in FIG. 16, the sliding base 2 further defines a second receiving hole 2208, and a vibration portion of the receiver 51 is in communication with the first receiving hole 521101 in the connecting portion 5211 and the second receiving hole 2208 in the sliding base 2 in sequence, such that a sound signal of the receiver 51 is output through the first receiving hole 521101 and the second receiving hole 2208 in sequence, after the receiver 51 extends out of the receiving groove 1204. As illustrated in FIG. 13 and FIG. 16, the second receiving hole 2208, the first function portion 2201, the second function portion 2202, the third function portion 2203 and the seventh function portion 2207 are provided in the first sliding plate 22. As illustrated in FIG. 14 and FIG. 16, the fourth function portion 2204, the fifth function portion 2205 and the sixth function portion 2206 are defined in the second sliding plate 23.

In some embodiments, as illustrated in FIG. 16, the second receiving hole 2208 is arranged adjacent to a first end face 201. The vibration portion of the receiver 51 is hermetically connected to the first receiving hole 521101 and the second receiving hole 2208. The vibration portion of the receiver 51 vibrates to generate the sound signal, and the sound signal is transmitted to the outside through the first receiving hole 521101 and the second receiving hole 2208 in sequence.

It should be understood that, as illustrated in FIG. 13, once the second receiving hole 2208 is exposed, the sound signal of the receiver 51 can be transmitted to the outside through the first receiving hole 521101.

In the electronic device 100 provided by embodiments of the present application, the sliding base 2 can extend out of or retract into the middle frame 1 according to the user's actual requirements. In some embodiments, when a certain element of the electronic assembly 5 in the sliding base 2 needs to work, the sliding base 2 is slid accordingly, such that the sliding base 2 is in the stretched state. In this case, function portions of the sliding base 2 are not shielded by the display screen, and function elements corresponding to the function portions can communicate with the outside.

It should be understood that, as illustrated in FIG. 15, the drive mechanism 3 is fixed in the inner chamber of the middle frame 1 and connected to the sliding base 2, so as to drive the sliding base 2 to slide relative to the middle frame 1.

Figure 17:
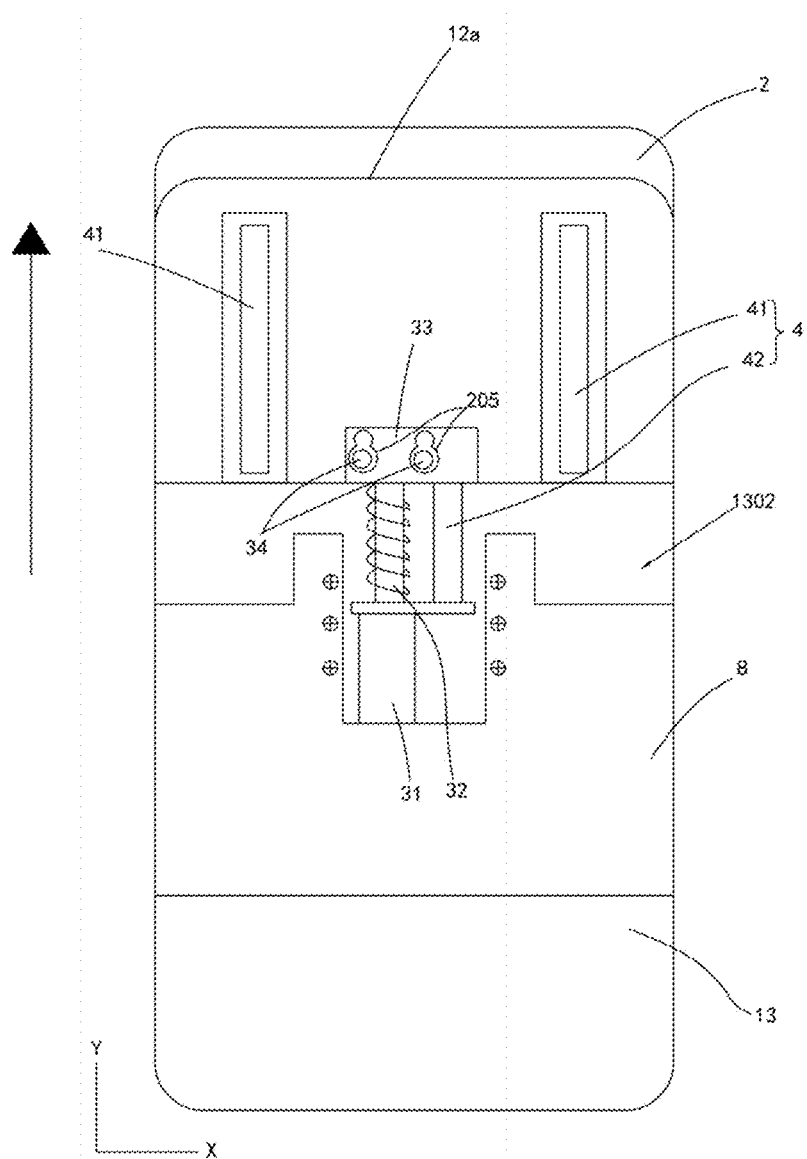
FIG. 17 is a schematic view of the electronic device in FIG. 13, in which the electronic device is in a stretched state.
Figure 18:
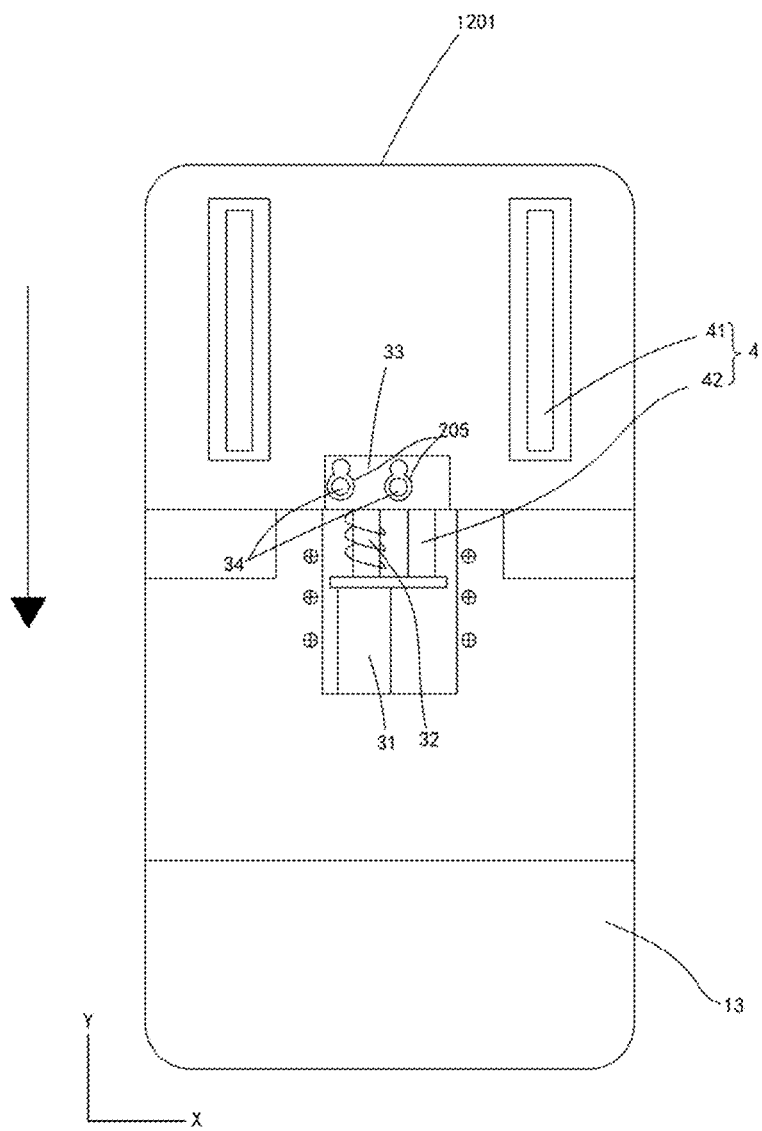
FIG. 18 is a schematic view of the electronic device in FIG. 13, in which the electronic device is in a retracted state.

As illustrated in FIG. 17 and FIG. 18, the drive mechanism 3 includes a motor 31 fixed in the middle frame 1, a driving rod 32 and a transmission block 33. The driving rod 32 has a first end fixedly connected to a shaft of the motor 31. The transmission block 33 is connected to the driving rod 32 in a transmission way. The transmission block 33 is connected to the sliding base 2, such that the transmission block 33 drives the sliding base 2 to slide under rotation of the motor 31.

As illustrated in FIG. 17 and FIG. 18, the drive mechanism 3 has a driving mode in which the rotation of the motor 31 is converted into a linear movement. In some embodiments, the driving rod 32 is a screw rod, and the transmission block 33 is in the shape of a block with a threaded hole fitted with the driving rod 32. The motor 31 rotates and drives the screw to slide relative to the transmission block 33 connected to the sliding base 2, thereby allowing the sliding base 2 to slide. The drive mechanism 3 is smooth in transmission, which guarantees that the sliding base 2 of a large size in the present application can slide relative to the middle frame 1 in a better way.

In some embodiments, as illustrated in FIG. 17 and FIG. 18, the motor 31 is fixed in an inner chamber of the middle frame 1, and the motor 31 is arranged vertically in the middle frame 1. In other words, the shaft of the motor 31 is parallel to the Y direction of the electronic device 100. The size of the motor 31 along the X direction can be guaranteed to be small due to the arrangement of the motor 31, thereby facilitating arrangement of elements of the electronic device 100 along the X direction. The first end of the driving rod 32 is fixedly connected to the shaft of the motor 31. The transmission block 33 is fitted over the driving rod 32. Once the motor 31 rotates, the driving rod 32 is driven to rotate. In this case, since the transmission block 33 is threadedly connected to the screw rod, the transmission block 33 can move along the Y direction of the electronic device 100, thereby driving the sliding base 2 connected to the transmission block 33 to move along the Y direction, such that the sliding base 2 can extend out of or retract into the receiving groove 1204.

A movement direction of the transmission block 33 changes along with a rotation direction of the motor 31. For example, as illustrated in FIG. 17, the motor 31 rotates forwards, and the transmission block 33 slides towards the top end face 1201 of the middle frame 1, such that the sliding base 2 extends out of the receiving groove 1204. Otherwise, as illustrated in FIG. 18, the transmission block 33 slides away from the top end face 1201 of the middle frame 1, such that the sliding base 2 retracts into the receiving groove 1204.

The sliding base 2 has a large size, and many elements of the electronic assembly 5 can be received in the sliding base 2 accordingly, which increases the weight of the sliding base 2 at a certain extent, thus resulting in a large influence on the sliding smoothness and accuracy of the sliding base 2. However, in the prior art, since the influence on the sliding smoothness and accuracy due to the weight of the sliding base 2 has not been overcome yet, there is generally no sliding base 2, and few elements are received in the sliding base 2 even if any.

In order to solve the above technical problem, the guide mechanism 4 is creatively arranged between the sliding base 2 and the middle frame 1 in the present application. The sliding smoothness and accuracy of the sliding base 2 in such a large size can be guaranteed because of the guide mechanism 4.

As illustrated in FIG. 17 and FIG. 18, a structure of the guide mechanism 4 is included in, but not limited to the following embodiments. The electronic device 100 further includes a supporting plate 13, and the supporting plate 13 covers the middle frame 1. The guide mechanism 4 includes at least one slide rail 41 and a guide rod 42. The at least one slide rail 41 is arranged on the supporting plate 13. The sliding base 2 is slidably connected to the at least one slide rail 41. The guide rod 42 has a first end fixed in the middle frame 1 and a second end, a length extending direction of the second end of the guide rod 42 is the same with that of the slide rail 41, and the second of the guide rod 42 is configured to slide relative to the sliding base 2.

The guide mechanism 4 is a combination of the slide rail 41 and the guide rod 42. On one hand, the slide rail 41 allows the sliding base 2 to slide in a predetermined direction, which guarantees the sliding accuracy of the sliding base 2. On the other hand, the sliding base 2 has a large size, the size of the sliding base 2 along the X direction is equal to the size of the middle frame 1 along the X direction, and the guide rod 42 can support and guide the sliding base 2 during the sliding of the sliding base 2, such that the sliding base 2 can slide relative to the middle frame 1 smoothly and accurately under the action of the guide mechanism 4, thereby further improving the reliability of the electronic device 100.

In some embodiments, as illustrated in FIG. 17, the supporting plate 13 covers the side frame 12. The supporting plate 13 includes a first supporting face 1301 and a second supporting face 1302 facing away from each other. The first supporting face 1301 is configured to carry a display module, and the second supporting face 1302 is configured to support the sliding base 2. The supporting plate 13 and the side frame 12 may be integrally formed. The supporting plate 13 may also be detached from the side frame 12. For example, the supporting plate 13 is fixed to the side frame 12 through a screw, rivet, etc. Thus, the receiving groove 1204 is arranged between the supporting plate 13 and the middle plate 11. Correspondingly, the sliding base 2 has a first sliding face and a second sliding face fitted with the supporting plate 13 and the middle plate 11, respectively. Correspondingly, the display element 7 may be carried on the supporting plate 13, and the main board 6 may also be carried on the supporting plate 13.

In some embodiments, as illustrated in FIG. 17, the supporting plate 13 is provided with two slide rails 41, and the two slide rails 41 are arranged adjacent to the side end faces 1202 of the middle frame 1 correspondingly. Accordingly, a sliding block corresponding to the slide rail 41 protrudes from the sliding base 2, such that the sliding base 2 can be slidably connected to the slide rail 41 via the sliding block.

It should be understood that, the slide rail 41 and the sliding block each have a dovetail-shaped section.

It should be understood that, as illustrated in FIG. 17, the motor 31 in the drive mechanism 3 is fixed to the supporting plate 13.

It should be understood that, as illustrated in FIG. 17, the guide rod 42 has a following specific structure. One guide rod 42 is provided, the guide rod 42 is arranged adjacent to the drive mechanism 3, and the first end of the guide rod 42 is fixed to the drive mechanism 3.

Since the guide rod 42 is arranged adjacent to the drive mechanism 3, the arrangement of elements is compact, which further reduces sizes of the drive mechanism 3 and the guide rod 42 along the X direction.

In some embodiments, as illustrated in FIG. 17 and FIG. 18, the first end of the guide rod 42 is fixed to the motor 31, and the second end of the guide rod 42 is slidably connected to the transmission block 33. In other words, the guide rod 42 passes through the transmission block 33, and the transmission block 33 also slides relative to the guide rod 42 when the transmission block 33 slides along with the rotation of the driving rod 32. The guide rod 42 has a function of supporting the transmission block 33 connected to the sliding base 2, so as to avoid an inclination of the sliding base 2 due to an uneven force exerted on the transmission block 33, which otherwise will result in poor sliding smoothness and accuracy of the sliding base 2, such that the sliding base 2 cannot smoothly slide out of or retract into the receiving groove 1204, but will impact on walls defining the receiving groove 1204. Thus, the reliability of the electronic device 100 is improved.

In an embodiment, as illustrated in FIG. 17 and FIG. 18, the sliding base 2 defines at least one connecting hole 205, and the drive mechanism 3 further includes at least one connecting rod 34. One connecting rod 34 has a first end fixed to the transmission block 33 and a second end passing through the connecting hole 205 of the sliding base 2. A central axis of the connecting rod 34 is perpendicular to the supporting plate 13, such that the sliding base 2 can slide relative to the connecting rod 34.

This connection between the sliding base 2 and the drive mechanism 3 guarantees that the degree of freedom between the sliding base 2 and the connecting rod 34 along the Z direction of the electronic device 100 is not limited, such that the sliding base 2 can adaptively adjust itself along the Z direction during sliding, and it thus can be prevented that the sliding base 2 gets stuck in the drive mechanism 3 during sliding and cannot slide further. Therefore, the reliability of the electronic device 100 is improved.

In some embodiments, as illustrated in FIG. 17, two connecting holes 205 are provided, central axes of the connecting holes 205 are parallel to the Z direction. Correspondingly, two connecting rods 34 are provided. The connecting rods 34 are pins. Each connecting rod 34 has a first end fixedly connected to the transmission block 33 and a second end passing through the connecting hole 205, and the second end of the connecting rod 34 cannot fall out of the connecting hole 205, so as to guarantee the connection between the sliding base 2 and the transmission block 33. In addition, a clearance connection is provided between a portion of the connecting rod 34 located inside the connecting hole 205 and the connecting hole 205, such that the sliding base 2 can slide relative to the transmission block 33 along the Z direction. That is, the degree of freedom between the sliding base 2 and the connecting rod 34 along the Z direction of the electronic device 100 is not limited, such that the sliding base 2 can adaptively adjust itself along the Z direction during sliding, and it thus can be prevented that the sliding base 2 gets stuck in the drive mechanism 3 during sliding and cannot slide further. Therefore, the reliability of the electronic device 100 can be improved.

In some embodiments, as illustrated in FIG. 17, the electronic device 100 switches from the retracted state to the stretched state as follows. The motor 31 rotates and thus the screw rod rotates to drive the transmission block 33 to slide towards the top end face 1201 of the middle frame 1, such that the sliding base 2 is driven to gradually extend out of the receiving groove 1204 until the sliding base is in the stretched state. Since the degree of freedom between the transmission block 33 and the sliding base 2 along the Z direction of the electronic device 100 is not limited, the sliding base 2 can adaptively adjust itself.

The guide mechanism 4 limits the sliding base 2 in a predetermined direction.

In some embodiments, as illustrated in FIG. 18, the electronic device 100 switches from the extending state to the retracting state as follows. The motor 31 rotates and thus the screw rod rotates to drive the transmission block 33 to slide away from the top end face 1201 of the middle frame 1, such that the sliding base 2 is driven to gradually retract into the receiving groove 1204 until the sliding base is in the retracted state. Since the degree of freedom between the transmission block 33 and the sliding base 2 along the Z direction of the electronic device 100 is not limited, the sliding base 2 can adaptively adjust itself.

The guide mechanism 4 limits the sliding base 2 in the predetermined direction.

In the electronic device 100 provided by the embodiments of the present application, a plurality of elements are arranged in the sliding base 2, and the sliding base 2 can slide relative to the middle frame 1. When the plurality of elements need to be used, the drive mechanism 3 drives the sliding base 2 to slide out of the middle frame 1, such that the function portion can extend out of the middle frame 1 to transmit signals. That is, the function portion corresponding to the electronic assembly 5 does not need to be arranged in the display screen of the electronic device 100, which is beneficial to an increase of the screen-to-body ratio of the electronic device 100. Moreover, the guide mechanism 4 allows the sliding base 2 to slide relative to the middle frame 1 within a predetermined track, which guarantees the sliding accuracy and smoothness of the sliding base 2.

Moreover, in the electronic device 100 provided by the embodiments of the present application, the depth element 522, the first camera 523 and the projector 524 are arranged on the first fixing portion 5212 and the second fixing portion 5213 of the bracket 521 correspondingly, and the connecting portion 5211 arranged between the first fixing portion 5212 and the second fixing portion 5213 is configured to be provided with a first function element. In this case, a plurality of elements are mounted on the bracket 521 together, such that the mounting of the plurality of elements can be completed by mounting the bracket 521 on a device where the plurality of elements are to be mounted during the mounting of the plurality of elements, which improves the mounting efficiency.

Figure 19:
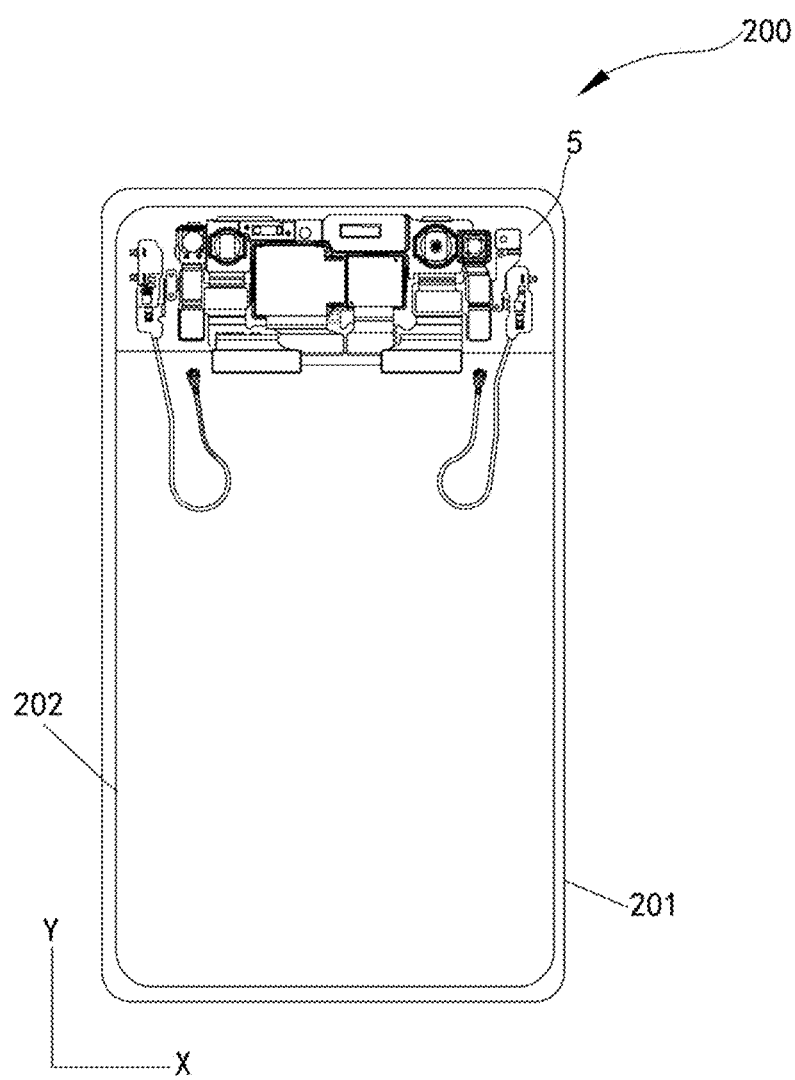
FIG. 19 is a schematic view of another electronic device according to a second embodiment of the present application.

As illustrated in FIG. 19, another electronic device 200 provided by an embodiment of the present application includes a housing 201, a display module 202 and an electronic assembly 5. The display module 202 covers the housing 201, the electronic assembly 5 is arranged in the housing 201, and the second camera 561 is configured to capture image information in a direction facing away from the display module 202.

The electronic assembly 5 of the electronic device 200 provided by the embodiment of the present application is substantially the same with the electronic assembly 5 of the electronic device 100 provided by the first embodiment of the present application, but mainly differs in that, the electronic assembly 5 of the electronic device 200 according to the embodiment of the present application is fixed in the electronic device 200, while the electronic assembly 5 in the electronic device 100 provided by the first embodiment of the present application is slidable.

It should be understood that, for a structure of the electronic assembly 5 of the electronic device 200 according to the embodiment of the present application, a reference can be made to the electronic assembly 5 of the electronic device 100 according to the first embodiment of the present application, which will not be repeated herein.

Figure 20:
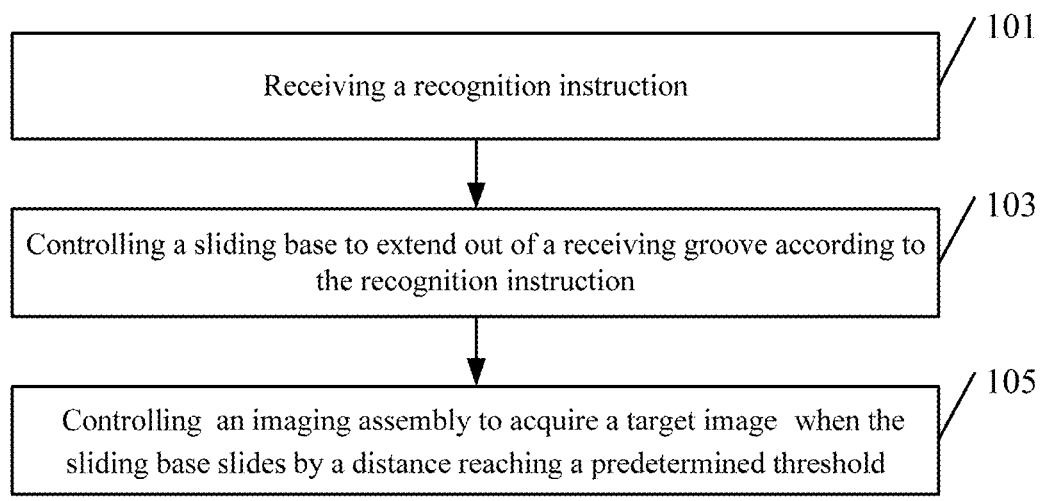
FIG. 20 is a flow chart illustrating a control method for an electronic device according to an embodiment of the present application.

As illustrated in FIG. 20, a control method for an electronic device according to embodiments of the present application is provided. The method can be applied to, but is not limited, the electronic device according to the first embodiment of the present application. In some embodiments, the electronic device mainly includes a middle frame, a sliding base and an imaging assembly received in the sliding base. The middle frame defines a receiving groove. The sliding base is slidably connected in the receiving groove. The imaging assembly includes a depth element, a first camera and a projector.

The control method for the electronic device provided by the embodiments of the present application includes the following actions.

At block 101, a recognition instruction is received.

In some embodiments, the recognition instruction can be input through an interaction, such as a voice interaction, a brain wave interaction, etc. between a user and the electronic device.

At block 103, the sliding base is controlled to extend out of the receiving groove according to the recognition instruction.

In some embodiments, the sliding base is controlled to slide by a predetermined stroke relative to the receiving groove, such that the imaging assembly is not shielded anymore, and thus a signal transmission between the imaging assembly and the external is possible.

At block 105, when a distance slid by the sliding base reaches a predetermined distance threshold, and the imaging assembly is controlled to acquire a target image.

In some embodiments, when the distance slid by the sliding base reaches the predetermined distance threshold, the projector is configured to emit a specially modulated infrared light to a subject to be shot, the depth element receives the infrared light reflected back by the subject to be shot and acquires the spatial information of the subject to be shot by calculation. The first camera is configured to shoot a color image of the subject to be shot. Image information captured by the depth element and the first camera is sent to an image processing chip, the image processing chip can combine the depth image information and the first hue image information, and thus obtain the target image after the algorithm processing. The target image may be a color picture with depth information.

When the depth element and the first camera capture image information of the subject, the image information of the above two overlaps, which is defined as image overlapping area information. The image process chip processes the image overlapping area information to generate the color picture with information for recognition.

With the control method for the electronic device provided by the embodiments of the present application, after the recognition instruction is input, the sliding base is controlled to slide by the distance reaching the predetermined distance threshold, and then the imaging assembly is controlled to obtain the target image. Therefore, the control method has a high automation degree and thus can improve the user's experience.

The descriptions above are just embodiments of the present application, it should be noted that the improvements and the embellishments within the scope of the tenets of the invention shall be within the protection range of the invention to the technical personnel in this field.

What is claimed is:

1. An electronic assembly, comprising a bracket, a depth element configured to acquire depth image information, a first camera configured to acquire first hue image information, a projector and a second camera configured to acquire second hue image information, wherein the depth element, the first camera, the projector and the second camera are arranged on the bracket together, and the second camera is arranged between the depth element and the first camera, and an image acquisition direction of the second camera is opposite to an image acquisition direction of the first camera;
wherein the first camera is located between the depth element and the projector in such a manner that the first camera is arranged adjacent to the projector and spaced apart from the depth element,
wherein the electronic assembly further comprises a fill light arranged adjacent to the depth element, and the depth element is arranged between the fill light and the first camera.

2. The electronic assembly according to claim 1, further comprising a third camera, wherein the third camera is arranged adjacent to the second camera, and an image acquisition direction of the third camera is same with the image acquisition direction of the second camera.

3. The electronic assembly according to claim 2, wherein the second camera is a telephoto camera, and the third camera is a wide angle camera.

4. The electronic assembly according to claim 2, wherein the second camera is a color camera, and the third camera is a black and white camera.

5. The electronic assembly according to claim 2, wherein the bracket comprises:
a connecting portion provided with the second camera and the third camera; and
a first fixing portion and a second fixing portion arranged at two opposite sides of the connecting portion correspondingly, the depth element being fixed to the first fixing portion, and the first camera being arranged on the second fixing portion.

6. The electronic assembly according to claim 5, wherein the connecting portion comprises a connecting plate and two adjacent embedding grooves recessed in the connecting plate, the second camera and the third camera are embedded in the two adjacent embedding grooves correspondingly.

7. The electronic assembly according to claim 6, wherein the first fixing portion comprises a first fixing plate and a first annular protrusion, the first fixing plate defines a first hollow-out part, the first annular protrusion protrudes from the first fixing plate, the first annular protrusion has an inner chamber in communication with the first hollow-out part, the depth element is received in the inner chamber of the first annular protrusion, and the depth element is configured to capture the depth image information through the first hollow-out part.

8. The electronic assembly according to claim 6, wherein the second fixing portion comprises a second fixing plate and a second annular protrusion, the second fixing plate defines a second hollow-out part and a third hollow-out part spaced apart from each other, the second annular protrusion protrudes from the second fixing plate, the second annular protrusion has an inner chamber in communication with the second hollow-out part and the third hollow-out part, the first camera and the projector are received in the inner chamber of the second annular protrusion, the first camera is configured to capture the first hue image information through the second hollow-out part, and the projector is configured to conduct projection through the third hollow-out part.

9. The electronic assembly according to claim 6, wherein the second fixing portion comprises a third fixing plate, a third annular protrusion and a fourth annular protrusion, the third fixing plate defines a fourth hollow-out part and a fifth hollow-out part spaced apart from each other, the third annular protrusion and the fourth annular protrusion protrude from the third fixing plate and are spaced apart from each other, the third annular protrusion has an inner chamber in communication with the fourth hollow-out part, the fourth annular protrusion has an inner chamber in communication with the fifth hollow-out part, the first camera is received in the inner chamber of the third annular protrusion, the projector is received in the inner chamber of the fourth annular protrusion, the first camera is configured to capture the first hue image information through the fourth hollow-out part, and the projector is configured to conduct projection through the fifth hollow-out part.

10. The electronic assembly according to claim 6, wherein the bracket further comprises a third fixing portion, the third fixing portion is arranged adjacent to the first fixing portion, and the first fixing portion is arranged between the connecting portion and the third fixing portion,
wherein the fill light is fixed to the third fixing portion, and the fill light is configured to fill lights to the depth element.

11. The electronic assembly according to claim 10, wherein the third fixing portion has a fill-light fixing face, and the fill light is fixed to the fill-light fixing face.

12. The electronic assembly according to claim 10, further comprising two antenna components, wherein the two antenna components are arranged at two opposite sides of the bracket correspondingly, and the two antenna components are arranged adjacent to the third fixing portion and the second fixing portion correspondingly.

13. The electronic assembly according to claim 5, wherein the connecting portion comprises a frame body and a separator, the separator is arranged inside the frame body to separate a space inside the frame body into a first receiving space and a second receiving space, the second camera and the third camera are received in the first receiving space and the second receiving space correspondingly.

14. The electronic assembly according to claim 13, wherein the separator comprises a carrier plate and two fixing plates, the two fixing plates are connected to two ends of the carrier plate correspondingly, the two fixing plates are fixed to an inner side face of the frame body, and the carrier plate is configured for arrangement of a flash.

15. The electronic assembly according to claim 5, further comprising a light sensor, wherein the light sensor is arranged on the first fixing portion, and a light reception direction of the light sensor intersects with a direction of the depth element capturing the depth image information.

16. The electronic assembly according to claim 1, further comprising a proximity sensing component, the proximity sensing component being configured to measure a distance and sense an ambient light, the proximity sensing component being arranged on the bracket and facing away from the second camera, and an incident light direction of the proximity sensing component being opposite to an incident light direction of the second camera.

17. An electronic device, comprising:
a housing;
a display module covered on the housing; and
an electronic assembly arranged in the housing, the electronic assembly comprising a bracket as well as a depth element, a first camera, a projector and a second camera arranged on the bracket, the second camera being arranged between the depth element and the first camera, the depth element being configured to acquire depth image information, the first camera being configured to acquire first hue image information in a direction towards the display module, and the second camera being configured to acquire second hue image information in a direction facing away from the display module;
wherein the first camera is located between the depth element and the projector in such a manner that the first camera is arranged adjacent to the projector and spaced apart from the depth element;
wherein the electronic assembly further comprises a fill light arranged adjacent to the depth element, and the depth element is arranged between the fill light and the first camera.

18. An electronic device, comprising:
a middle frame comprising a pair of opposite side end faces and a top end face connected between the pair of side end faces, the top end face defining a receiving groove, the receiving groove passing through the pair of side end faces;
a sliding base received in the receiving groove;
a guide mechanism arranged between the sliding base and the middle frame;
a drive mechanism, the sliding base being slidably connected to the middle frame through the drive mechanism, such that the sliding base is configured to extend out of or be received in the receiving groove along a guide direction of the guide mechanism, under a drive of the drive mechanism; and
an electronic assembly received in the sliding base, the electronic assembly comprising a bracket as well as a depth element, a first camera, a projector and a second camera arranged on the bracket, the second camera being arranged between the depth element and the first camera, the depth element being configured to acquire depth image information, the first camera being configured to acquire first hue image information in a first direction, the second camera being configured to acquire second hue image information in a second direction, the first direction being opposite to the second direction, the first camera being located between the depth element and the projector in such a manner that the first camera is arranged adjacent to the projector and spaced apart from the depth element, the electronic assembly further comprising a fill light arranged adjacent to the depth element, and the depth element being arranged between the fill light and the first camera;
wherein the sliding base comprises a first function portion, a second function portion, a third function portion in a same face thereof, and a fourth function portion facing away from the first function portion, the depth element is configured to capture the depth image information through the first function portion, the first camera is configured to capture the first hue image information through the second function portion, the projector is configured to conduct projection through the third function portion, and the second camera is configured to capture the second hue image information through the fourth function portion.

19. The electronic device according to claim 18, wherein the sliding base comprises a sliding frame and two sliding plates, the sliding frame is made of conductive materials, the two sliding plates are covered on two sides of the sliding frame correspondingly, so as to define an inner chamber of the sliding base for receiving the electronic assembly, and the two sliding plates are made of light transparent materials.

* * * * *